(12) United States Patent
Tanaka et al.

(10) Patent No.: US 10,241,433 B2
(45) Date of Patent: Mar. 26, 2019

(54) IMAGE FORMING APPARATUS THAT CONTROLS A FIXING CONDITION OF A FIXING PORTION BASED ON A SHAPE OF A SHEET TO BE USED IN IMAGE FORMATION

(71) Applicant: CANON KABUSHIKI KAISHA, Tokyo (JP)

(72) Inventors: Shigeru Tanaka, Tokyo (JP); Yasuharu Chiyoda, Nagareyama (JP); Daigo Matsuura, Tokyo (JP); Mitsuru Hasegawa, Tsukubamirai (JP); Yusuke Yamaguchi, Nagareyama (JP); Shigeru Hirano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/933,755

(22) Filed: Mar. 23, 2018

(65) Prior Publication Data

US 2018/0284633 A1    Oct. 4, 2018

(30) Foreign Application Priority Data

Mar. 28, 2017    (JP) ................................ 2017-062720

(51) Int. Cl.
*G03G 15/20*    (2006.01)
*G03G 13/20*    (2006.01)
*G03G 13/16*    (2006.01)

(52) U.S. Cl.
CPC ............. *G03G 13/20* (2013.01); *G03G 13/16* (2013.01); *G03G 15/2039* (2013.01); *G03G 15/2046* (2013.01)

(58) Field of Classification Search
CPC .... G03G 13/16; G03G 13/20; G03G 15/2039; G03G 15/2046
See application file for complete search history.

(56) References Cited

U.S. PATENT DOCUMENTS

| 5,438,426 A * | 8/1995 | Miake .................. H04N 1/0036 358/403 |
| 9,261,825 B2 | 2/2016 | Chiyoda |
| 9,482,997 B2 | 11/2016 | Matsuura |
| 2013/0101303 A1 * | 4/2013 | Kasai .................. G03G 15/205 399/45 |

FOREIGN PATENT DOCUMENTS

| JP | 2003-149887 A | 5/2003 |
| JP | 2006-030629 A | 2/2006 |

* cited by examiner

*Primary Examiner* — Hoang Ngo
(74) *Attorney, Agent, or Firm* — Venable LLP

(57) ABSTRACT

An image forming apparatus includes a reading configured to read a shape of a sheet to be used for image formation, and an original sheet carrying an original image, and an image forming portion configured to form a toner image, corresponding to the original image read by the reading portion, on the sheet to be used for image formation. A fixing portion is configured to fix the toner image, formed by the image forming portion, to the sheet to be used for image formation. In addition, a controller is configured to control a fixing condition of the fixing portion in accordance with the shape of the sheet to be used for image formation read by the reading portion.

9 Claims, 13 Drawing Sheets

IMAGE FORMING APPARATUS THAT CONTROLS A FIXING CONDITION OF A FIXING PORTION BASED ON A SHAPE OF A SHEET TO BE USED IN IMAGE FORMATION

This application claims the benefits of Japanese Patent Application No. 2017-062720 filed on Mar. 28, 2017, which is hereby incorporated by reference herein in its entirety.

FIELD OF THE INVENTION AND RELATED ART

The present invention relates to an image forming apparatus for forming a toner image (i.e., an image formed of toner) on a sheet of recording medium (that hereafter may be referred to simply as recording medium).

In the field of an image forming apparatus, it has been proposed to set the conditions, under which image formation processes are controlled, according to the shape and the thickness of the recording medium to be used for image formation. Ordinarily, the size and the thickness of the recording medium to be used for image formation are selected by an operator through a controlling portion, or the like, of an image forming apparatus. Then, the conditions under which the image formation processes are controlled are automatically adjusted by the control portion of an image forming apparatus, according to the selected size and the selected thickness of the recording medium.

According to Japanese Laid-open Patent Application No. 2003-149887, the recording medium conveyance passage of the image forming apparatus is provided with an additional member for detecting the thickness of recording medium, and the conditions under which image formation processes are carried out are adjusted according to the detected thickness of the recording medium. According to Japanese Laid-open Patent Application No. 2006-30629, the width and the length of a sheet of recording medium that is unusual in shape are read by an image reading means for obtaining the information of an image to be formed.

The kinds of image formation processes that are controlled, and the concrete methods for controlling an image forming apparatus in image formation process according to the shape and the thickness of the recording medium, have not been addressed, however, in the past. In the past, therefore, all that could be done to deal with a sheet of recording medium that does not have an ordinary rectangular shape was to apply image formation conditions, such as those described regarding the conventional art, to the unusually shaped sheet of recording medium. Thus, it has been difficult to obtain the optimal products.

More concretely, it is possible that an image forming apparatus will become unstable in fixation temperature and/or fixation pressure, and, therefore, the apparatus will output toner images which are nonuniform in glossiness.

SUMMARY OF THE INVENTION

The present invention was made in consideration of such a situation as those described above. Thus, the primary object of the present invention is to provide an image forming apparatus that can easily set a fixation condition according to the characteristics (i.e., shape and a size) of a sheet of recording medium, even if the sheet does not have an ordinary rectangular shape.

According to an aspect of the present invention, there is provided an image forming apparatus comprising a reading portion configured to read a shape of a first sheet, the reading portion having a function of reading a second sheet carrying an original image, an image forming portion configured to form a toner image corresponding to the original image read by the reading portion, a fixing portion configured to fix the toner image formed by the image forming portion, and a controller configured to control a fixing condition of the fixing portion in accordance with the shape of the first sheet read by the reading portion.

Further features of the present invention will become apparent from the following description of exemplary embodiments with reference to the attached drawings.

Figure 9:
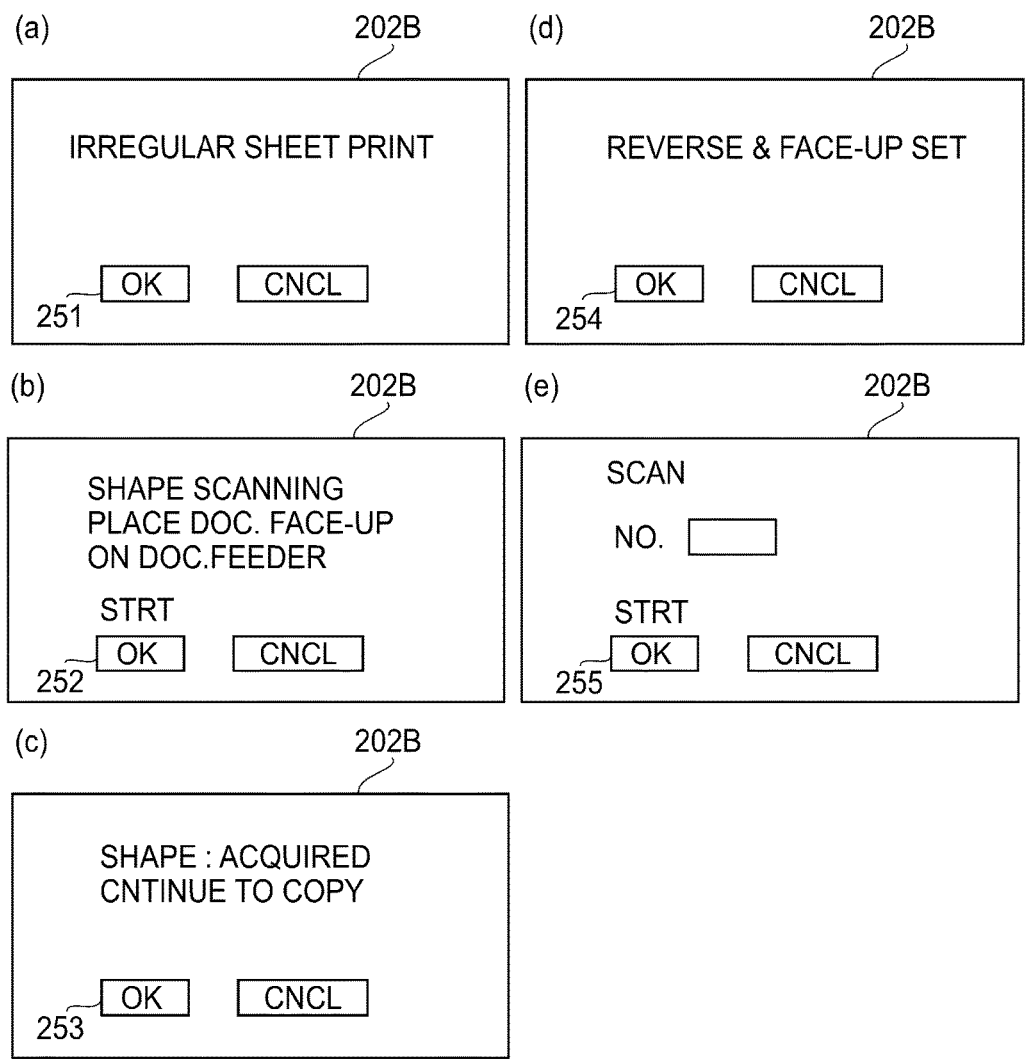

Parts (a) to (e) of FIG. 9 are a collection of various examples of a combination of instructions (prompts) and buttons displayable across a screen portion of a control panel of the image forming apparatus in the first embodiment.

Figure 10:
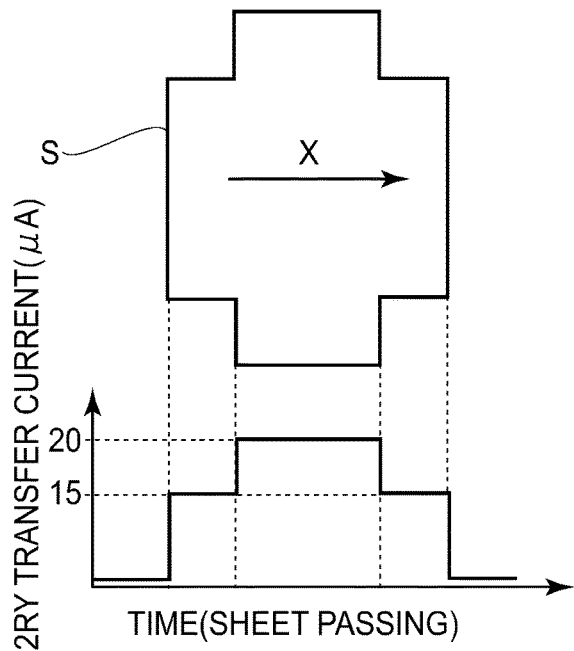

FIG. 10 is a drawing for describing a relationship between an amount of a secondary transfer current and a length of time elapsed after an entrance of an unusually shaped sheet of recording medium into the fixing apparatus in the first embodiment.

Figure 11:
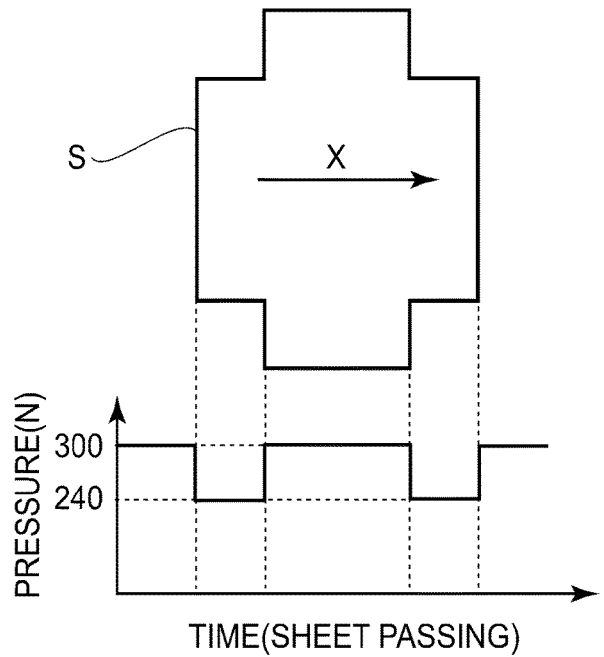

FIG. 11 is a drawing for describing a relationship between an amount of pressure applied to a fixation nip and a length of elapsed time after the entrance of the unusually shaped sheet of recording medium into the fixation nip.

Figure 12:
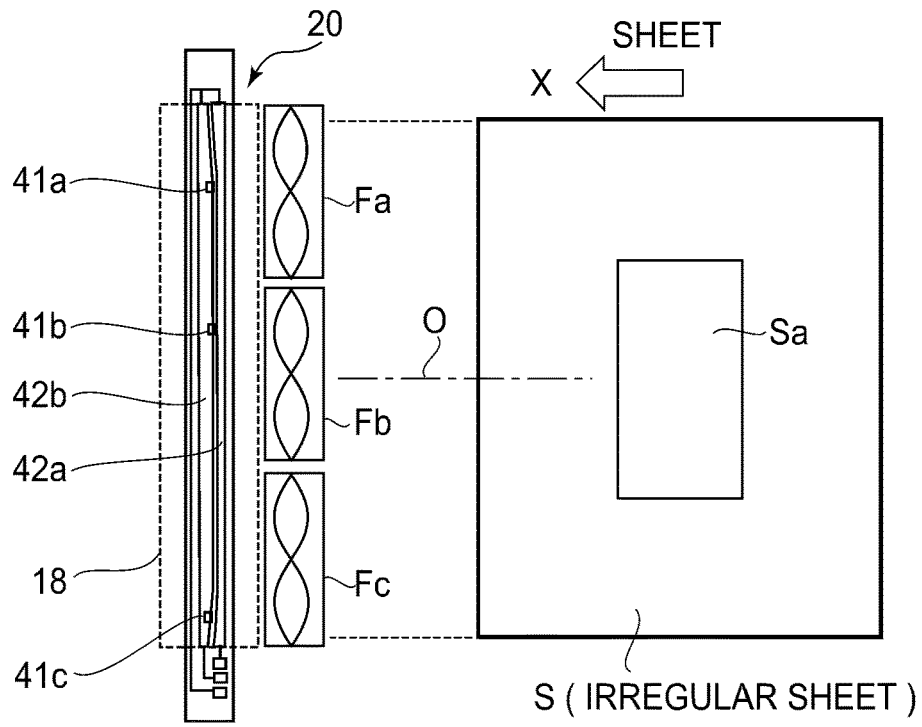

FIG. 12 is a schematic sectional view of the fixing apparatus in the second embodiment of the present invention, and is for describing the structure of the fixing apparatus.

Figure 13:
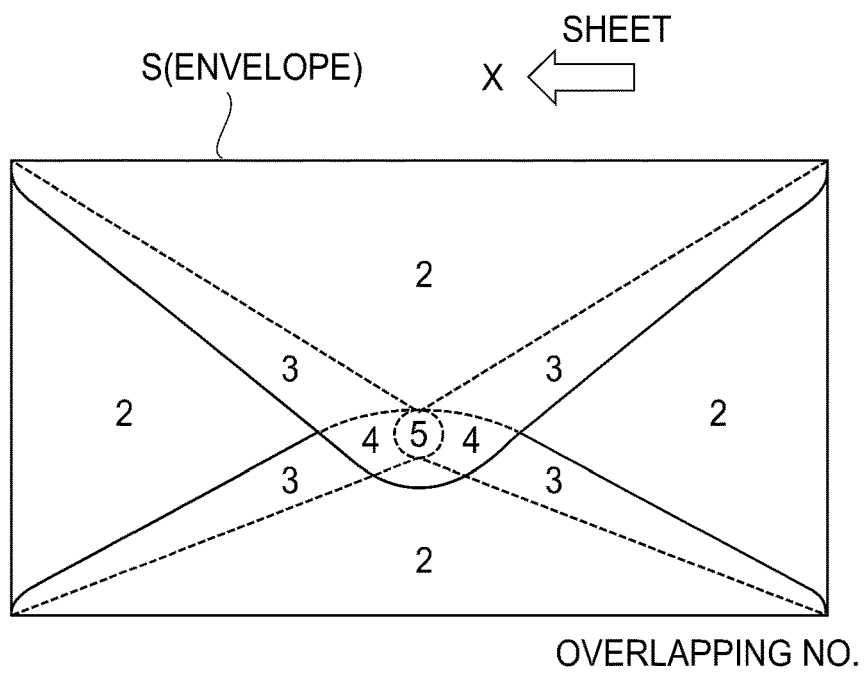

FIG. 13 is a schematic drawing of an envelope as an unusually shaped recording medium that can be accommodated by the image forming apparatus in the third embodiment of the present invention.

Figure 14:
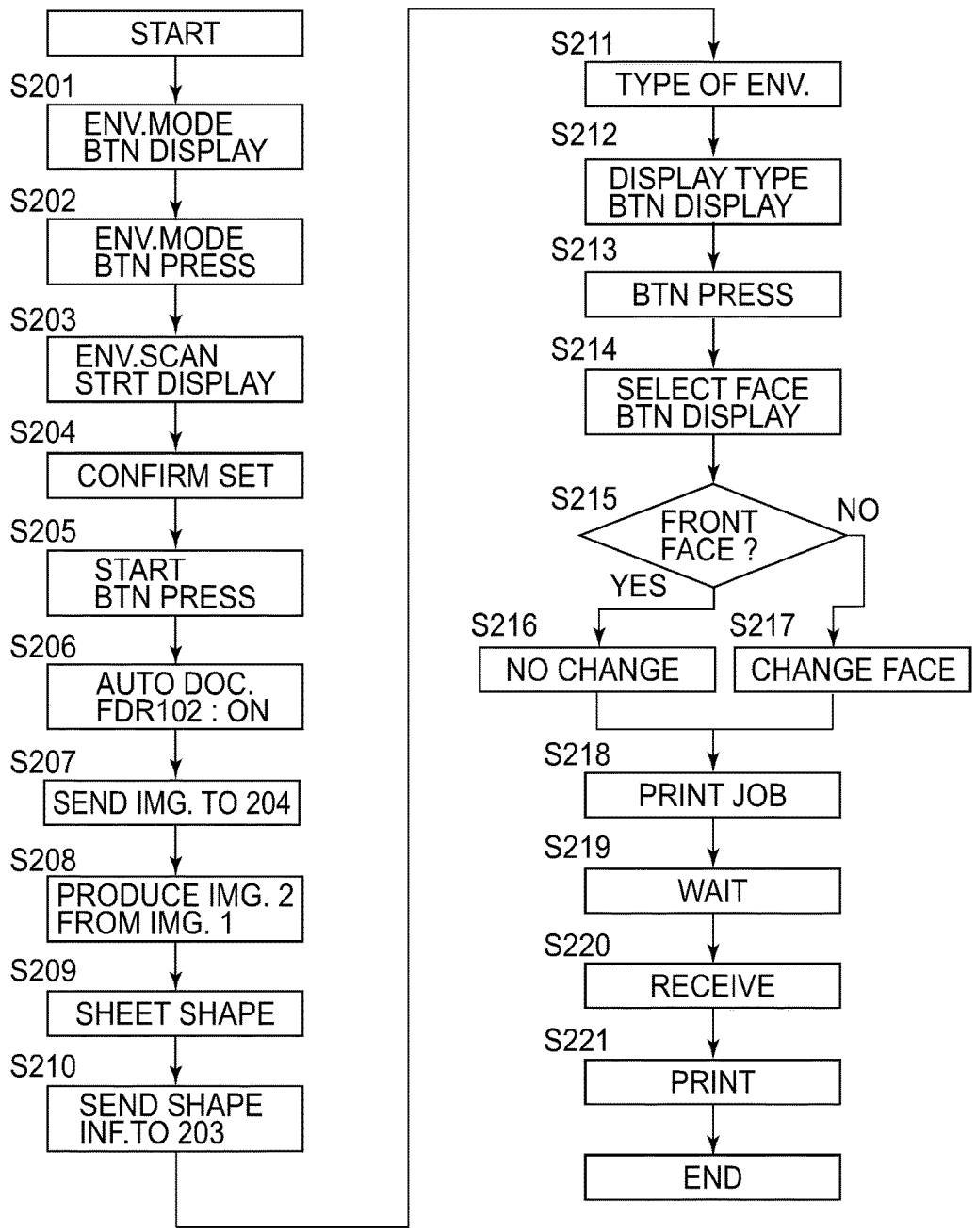

FIG. 14 is a flowchart of the operational sequence of the image forming apparatus in the third embodiment.

Figure 15:
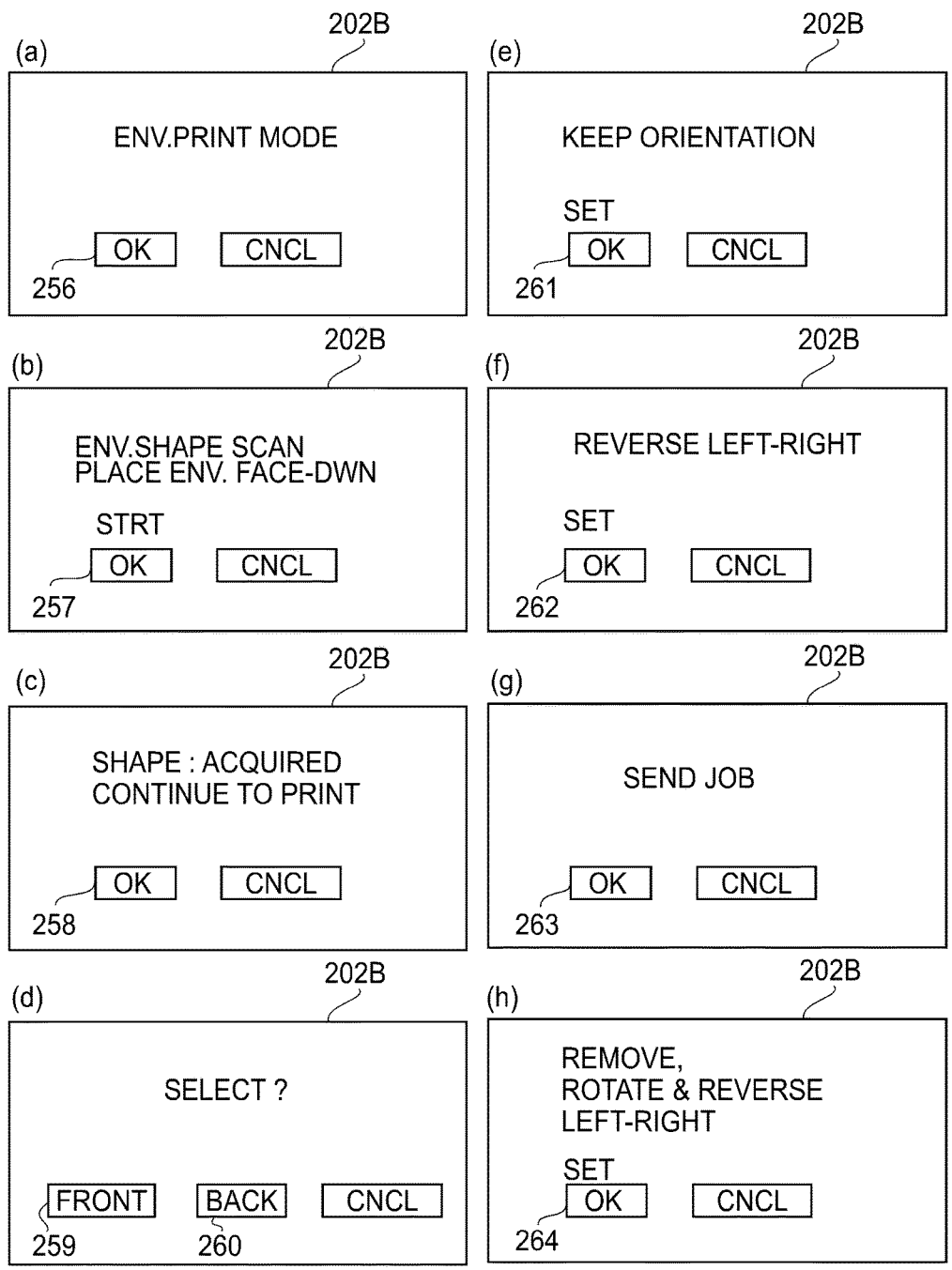

Parts (a) to (h) of FIG. 15 are a collection of various examples of a combination of instructions (prompts) and buttons displayable across the screen portion of the control panel of the image forming apparatus in the third embodiment.

Figure 16:
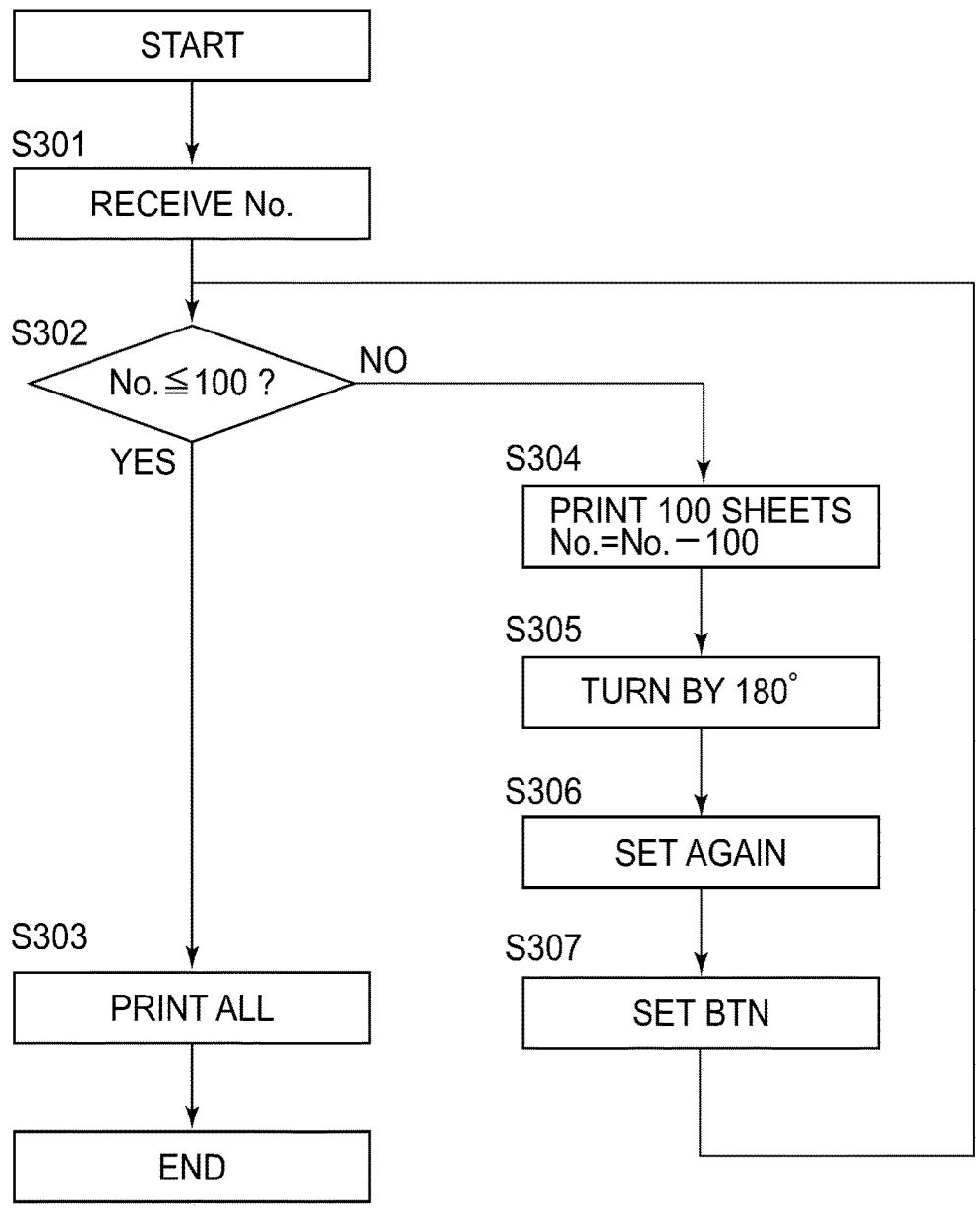

FIG. 16 is a flowchart of a subordinate operational sequence of one of a primary operational sequence of a printing portion of the image forming apparatus in the third embodiment.

DESCRIPTION OF THE EMBODIMENTS

Embodiment 1

Figure 1:
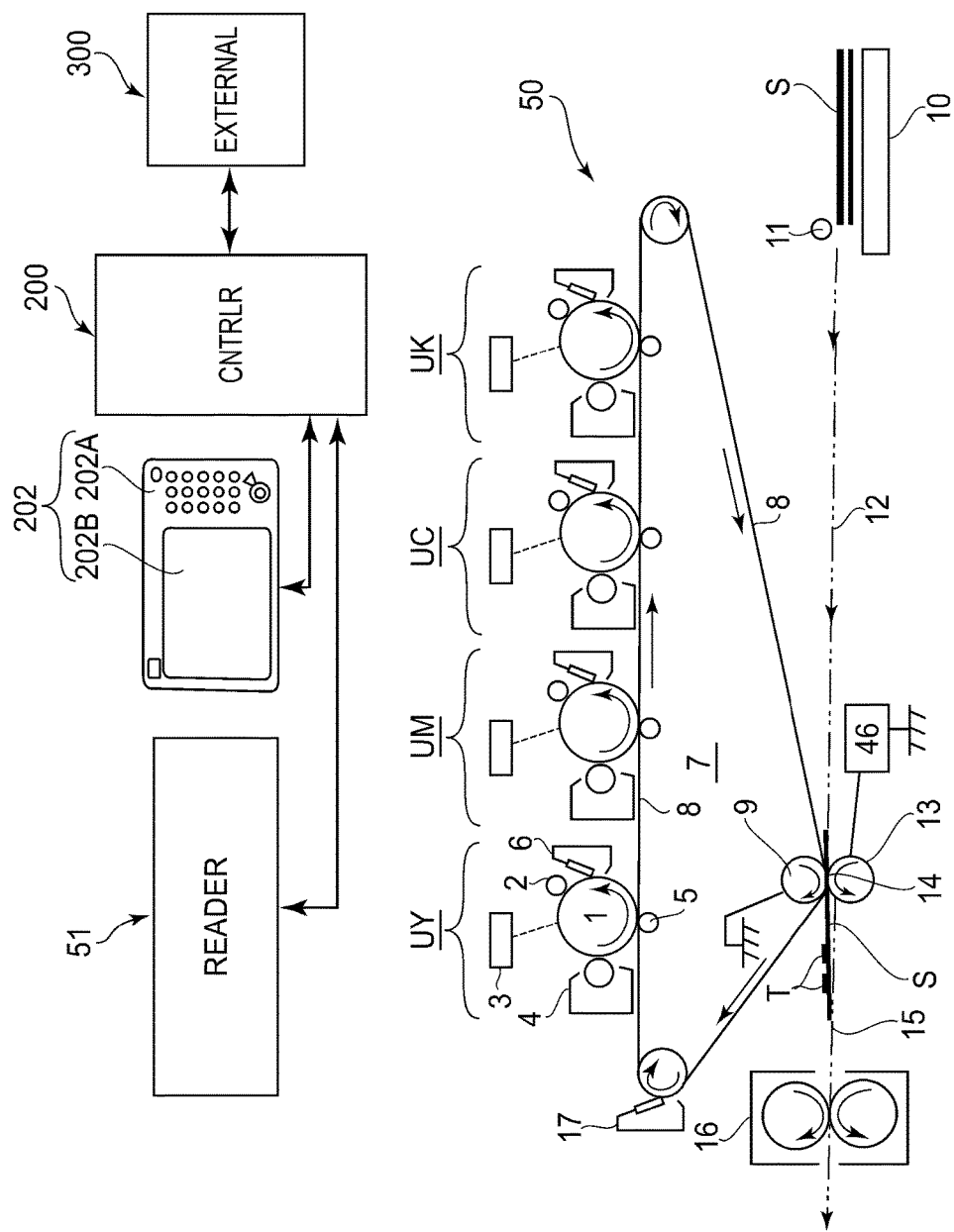
FIG. 1 is a schematic sectional view of the image forming apparatus in the first embodiment of the present invention, and is for describing the structure of the image forming apparatus.

FIG. 1 is a schematic sectional view of the image forming apparatus in this embodiment of the present invention, and is for describing the structure of the apparatus. This image forming apparatus is of the so-called intermediary transfer type, and uses an electrophotographic image forming method. Further, it is of the so-called tandem type, and is a digital color copying machine. Generally speaking, this image forming apparatus has an image reading portion 51 (original image reading means) for reading the original image to obtain the information (first information) of the image to be formed, a printing portion 50 (image forming portion, or image forming means) for forming a toner image on a sheet of recording medium, a fixing apparatus 16 (fixing means) for applying a combination of a preset amount of heat and a preset amount of pressure to the sheet of recording medium and the toner image thereon to fix the toner image to the sheet, a control panel 20 (user interface) to be used by a user to control the image forming apparatus, and a control portion 200 (controlling means).

The printing portion 50 has an image bearing member 8 on which a toner image is formed based on the above-mentioned first information (information of image to be formed), and a transferring means 13 for transferring the toner image, formed on the image bearing member 8, onto a sheet S of recording medium, with the use of a preset amount of voltage or electrical current.

A job, which is a combination of the data of the image to be formed, and the information of the recording medium to be used for the job, is inputted into the control portion 200 from an external device 300, such as the original image reading portion 51, a personal computer (PC), an image reader, a network, a facsimileing machine, the control panel 202, etc. As the job is inputted, the printing portion 50 carries out an image forming operation that matches the inputted job, to output a full-color or a monochromatic print.

The control portion 200 is in charge of the overall operation of the image forming apparatus. That is, the control portion 200 controls the conditions under which the printing portion 50 forms an image. The information of the original read by the original image reading portion 51 is inputted into the control portion 200 from the original image reading portion 51. The setting and the instruction regarding the image formation are inputted into the control portion 200 by a user (operator) through a control panel 202. Further, the information regarding the condition of the image forming apparatus, and related operational instructions, are offered to the user across the screen of the control panel 202 from the control portion 200.

The control panel 202 is provided with an inputting portion 202A and a displaying portion 202B (display screen, user interface (UI) screen, or informing means). The inputting portion 202A is provided with various keys, such as a main switch, a group of numerical keys for inputting numerical values, a print-start button, a print-stop key, and an economy mode button. The displaying portion 202B is a liquid crystal screen (liquid crystal touch panel), across which not only various information, such as types of sheets S of recording medium usable by the image forming apparatus, but also, images of various buttons to be used to control the image forming apparatus are displayed. The information regarding the various operations to be carried out by the image forming apparatus, and also, the information regarding the types of sheets S of recording medium to be used for image formation, can also be inputted with the use of the buttons displayed across the displaying portion 202B.

The information regarding the various settings for the operations to be carried out by the image forming apparatus, and the information regarding the types of sheets S of recording medium, are inputted into the control portion 200 also from the external devices 300, such as a PC.

Here, a "sheet" is a sheet S of recording medium (media, or material) across which a toner image can be formed by the printing portion 50. As a "sheet", a sheet of ordinary paper, which is ordinary or unusual in shape, a sheet of thin paper, a sheet of cardstock, a sheet of high quality paper, an envelope, a post card, a seal, a label, a sheet of resinous substance, a sheet of overhead projector (OHP) film, a sheet of printing paper, a formatted sheet of paper, etc., can be listed, for example. Hereafter, a "sheet" may be referred to simply as a recording medium, or a recording material.

A "job (image formation job)" means an image formation instruction that includes the information, such as the image data, a preset type, a basis weight, a size, and a shape of recording medium, a preset post image formation process, etc.

Printing Portion 50

The printing portion 50 has four image forming portions UY, UM, UC, and UK that form yellow (Y), magenta (M), cyan (C), and black (K) toner images, respectively. These image forming portions UY, UM, UC, and UK are aligned in tandem in the left-to-right direction with reference to FIG. 1. The image forming apparatus is provided with an intermediary transfer belt unit 7, which is on the bottom side of the combination of these image forming portions.

The four image forming portions UY, UM, UC, and UK are roughly the same in structure, although they are different in the color of the toner (developer) they use. They use an electrophotographic process. Each image forming portion UY, UM, UC, and UK has an electrophotographic photosensitive drum 1 (that hereafter may be referred to simply as drum) as the first image bearing member, a charge roller 2, an exposing apparatus 3 (laser scanner), a developing device 4, a primary transfer roller 5, and a drum cleaner 6. By the way, for the purpose of preventing FIG. 1 from appearing unnecessarily complicated, the referential codes for these components, members, portions, etc., in the image forming portions UM, UC, and UK are not shown, and only the referential codes for the components, member, portions, etc., in the image forming portion UY are shown in FIG. 1. Further, the electrophotographic image formation process used by each image forming portion UY, UM, UC, and UK, and the image forming operation of each image forming portion UY, UM, UC, and UK, are well-known, and, therefore, are not described here.

The four toner images, different in color, which are on the four drums 1 in the four image forming portions U, one for one, are transferred in layers (primary transfer) in a preset manner, onto an intermediary transfer belt 8 (intermediary transferring member, which hereafter will be referred to as a transfer belt), as the second image bearing member, of the intermediary transfer belt unit 7, which is being circularly moved. Consequently, an unfixed full-color toner image T is formed on the transfer belt 8, of the four monochromatic toner images, that is, yellow (Y), magenta (M), cyan (C), and black (K) toner images.

Meanwhile, multiple sheets S of recording medium (transfer medium) set in a recording medium holding portion 10 (sheet feeding portion or recording medium setting portion) are fed one by one into a main assembly of the image forming apparatus. Then, each sheet S of recording medium is introduced into the secondary transfer nip 14, with a preset control timing, through a recording medium conveyance passage 12. Then, each sheet S of recording medium is conveyed through the secondary transfer nip 14. While the sheet S is conveyed through the secondary transfer nip 14, the layered four toner images, different in color, on the transfer belt 8 are transferred together (secondary transfer) onto the sheet S. A secondary transfer roller 13 (transferring means) is kept pressed against a backup roller 9 of the intermediary transfer belt unit 7, with the presence of the transfer belt 8 between the two rollers 13 and 9. The area of contact between the transfer belt 8 and the secondary transfer roller 13 is the secondary transfer nip 14.

As soon as the sheet S of recording medium moves through the secondary transfer nip 14, the sheet S is separated from the transfer belt 8. Then, the sheet S, which bears the toner image T that has just been transferred onto the sheet S, is introduced into a fixing apparatus 16 (fixing means) through a recording medium conveyance passage 15, and is conveyed through the fixing apparatus 16. As the sheet S is conveyed through the fixing apparatus 16, the toner image T is fixed to the sheet S by a combination of heat and pressure (i.e., a preset amount of heat and a present amount of pressure) applied to the sheet S and the toner image T thereon, by the fixing apparatus 16. More specifically, as the unfixed four toner images, different in color, are subjected to the combination of heat and pressure applied thereon, they melt and mix. Then, as they cool down, the four toner images become fixed to the sheet S, yielding a permanent full-color image. Then, the sheet S is outputted as a finished product (print) from the fixing apparatus 16. The transfer residual toner, or the toner remaining on the transfer belt 8 after the secondary transfer of the toner image T onto the sheet S, is removed from the surface of the transfer belt 8 by the belt cleaner 17.

Toner

Toner is made by mixing bonding resin such as styrene resin, polyester resin, or the like, a coloring agent, such as carbon black, magnetite, dye, pigment, or the like, and a releasing agent, such as wax, charge control agent, or the like, at a proper ratio. Nonmagnetic toner, such as the one described above, can be manufactured with the use of such a method as pulverization and polymerization. There is no requirement regarding the particle diameter of toner. From the standpoint of yielding images that are excellent in terms of graininess and tone, however, toner is desired to be no less than 4 μm and no more than 8 μm in particle size.

Intermediary Transfer Belt

As the resinous substances that can be used as the material for the transfer belt 8, which is endless and circularly movable, just about any resinous substance is usable, as long as it is thermoplastic and thermally curable. As the thermoplastic resin, polyethyleneterephthalate (PET), polycarbonate (PC), polyamide (PA), polyphenylsulfide (PPS), polyether-sulfon (PES), polyetheretherketon (PEEK), or the like, can be used. Further, as the thermally curable resin, polyimide (PI) can be used.

Carbon black and/or metallic particles, as an electrically conductive substance, are mixed into the above-mentioned resinous substance by a proper amount. Then, the mixture is formed into an endless belt. The finished belt is $1\times10^9 \Omega\cdot cm$ to $1\times10^{13}$ $\Omega\cdot cm$ in volume resistivity, and $1\times10^9 \Omega/sq$ to $1\times10^{13} \Omega/\square$ in surface resistivity. This range in resistance is such a range that a toner image can be preferably transferred.

If the transfer belt 8 is excessively low in electrical resistance, the electrical charge given to the back surface of the transfer belt 8 quickly attenuates, reducing thereby the electrostatic force that keeps the toner image held to the transfer belt 8, during the transfer (primary) of a toner image from the drum 1 of each image forming portion UY, UM, UC, and UK onto the transfer belt 8. Thus, the toner image is likely to be disturbed after its transfer onto the intermediary transfer belt 8. On the other hand, if the transfer belt 8 is excessively high in electrical resistance, the transfer belt 8 becomes overcharged, increasing therefore the electrostatic attraction between the drum 1 and the transfer belt 8 during the primary transfer. Thus, as a given portion of the transfer belt 8 separates from the photosensitive drum 1, an electrical discharge occurs between the photosensitive drum 1 and this portion of the transfer belt 8, making it likely for the toner image T on the intermediary transfer belt 8 to be disturbed.

Secondary Transfer

As for the transfer (secondary transfer) of a toner image T from the transfer belt 8 onto a sheet S of recording medium in the secondary transfer nip 14, the secondary transfer voltage (positive in this embodiment), which is opposite in polarity to the polarity to which toner is charged, is applied to the secondary transfer roller 13 from a bias voltage power source 45, which is under the control of the control portion 200. As a result, the four toner images, different in color, on the transfer belt 8 are electrostatically transferred together onto the sheet S of recording medium (secondary transfer). The secondary transfer roller 13 is synchronously rotated with the transfer belt 8, by the transfer belt 8 as the transfer belt 8 is rotationally driven. The backup roller 9, against which the secondary transfer roller 13 is pressed with the presence of the intermediary transfer belt 8 between the two rollers 13 and 9, is grounded.

The secondary transfer roller 13 is made up of a metallic roller, and an electrically conductive elastic layer formed on the peripheral surface of the metallic roller in a manner to envelop the metallic roller. As the material for the elastic layer, a mixture of a foamable rubbery substance, such as nitrile-butadiene rubber (NBR), urethane, and epichlorohydrin, and an ion-conductive agent for adjusting the mixture in electrical resistance to a value in a range of $1\times10^7$ to $1\times10^9$ $(\Omega)$ may be used. The secondary transfer roller 13 is greater in width (dimension in terms of direction perpendicular to recording medium conveyance direction X (i.e., a direction in which sheet is conveyed)) than the widest sheet S of recording medium that the printing portion 50 can accommodate.

Fixing Apparatus

Figure 2:
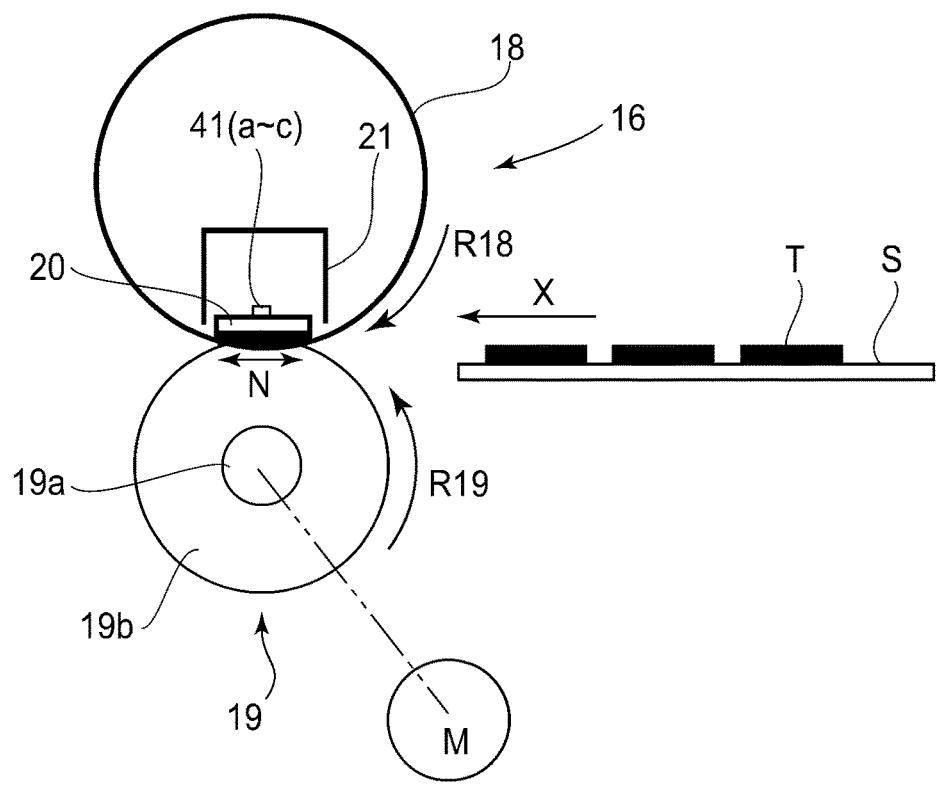
FIG. 2 is a schematic sectional view of an essential portion of a fixing apparatus in the first embodiment, and is for describing the structure of the essential portion.

FIG. 2 is a schematic cross-sectional view of the essential portions of the fixing apparatus 16. This fixing apparatus 16 employs a fixation belt (film), through which a sheet S of recording medium and the toner image thereon are heated. It is substantially shorter in the length of startup time, and also, substantially smaller in power consumption, than other types of fixing apparatuses, being, therefore, referred to as an on-demand fixing device (OMF device). Since this type of fixing apparatus has been well-known, it will be only briefly described.

The fixing apparatus 16 has a fixation belt 18 that is circularly movable, and an elastic pressure roller 19, which is placed in contact with the bottom portion of the loop (belt loop) that the fixation belt 18 forms. Further, it has a combination of a heater holder 21 and a heater 20 (ceramic heater), which is disposed on the inward side of the fixation belt loop. The heater 20 is attached to the bottom surface of the heater holder 21 in a manner to extend in the lengthwise direction of the heater holder 21. The fixing apparatus 16 is structured so that the fixation belt 18 is allowed to slide on the heater 20, with the inward surface of the fixation belt 18 remaining in contact with the heating surface of the heater 20. The heater holder 21 is formed of highly heat resistant liquid polymer. Not only does the heater holder 21 play the role of holding the heater 20, but also, the heater holder plays the role of guiding the fixation belt 18.

The lengthwise ends of the heater holder 21 are kept pressed toward the axial line of the pressure roller 19 by a preset amount of pressure applied by a pressure applying mechanism 45 (shown in the block diagram of the control system in FIG. 6, which does not show structural details of the pressure applying mechanism 45), which is under the control of the control portion 200. Thus, the bottom surface (i.e., a heating surface) of the heater 20 is pressed against the pressure roller 19, with the presence of the fixation belt 18 between the heater 20 and the pressure roller 19, by the preset amount of pressure, causing, therefore, the elastic layer of the pressure roller 19 to be compressed against its resiliency. Therefore, a fixing nip N, which has a preset width, in terms of the recording medium conveyance direction X, necessary for image fixation is formed between the fixation belt 18 and the pressure roller 19.

Figure 4:
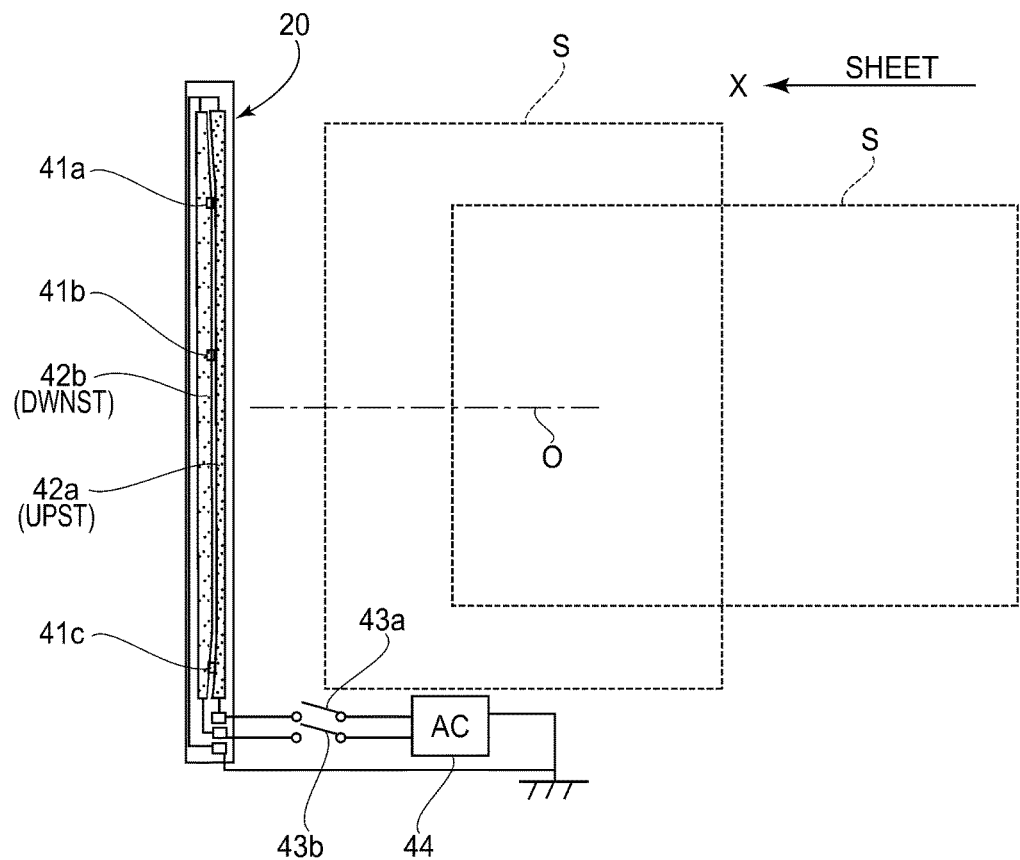
FIG. 4 is a schematic drawing of an electrical power supply system for the heater.

The fixing apparatus 16 is provided with multiple (three, in this embodiment) temperature sensors 41a, 41b, and 41c (temperature detecting means, collectively, 41) for detecting the temperature of the top surface of the heater 20. The temperature sensors 41 are distributed across the heater 20 in the lengthwise direction (that is perpendicular to the recording medium conveyance direction X) (FIG. 4). The information regarding the temperature detected by the temperature sensors 41a, 41b, and 41c is fed back to the control portion 200.

Fixation Belt

The fixation belt 18 has a substrative layer, and a surface layer coated on the outward surface of the substrative layer. The substrative layer is formed of heat resistant resin, such as PI, polyamide-imide (PAI), and PEEK, or a metallic substance, such as stainless steel (SUS), aluminum (Al), nickel (Ni), copper (Cu), and zinc (Zn), or an alloy thereof, which is heat resistant and thermally highly conductive. In a case in which a resinous substance is used as the material for the substrative layer, particles of boron nitride (BN), alumina, Al, or the like, which is thermally highly conductive, may be mixed into the resinous substance to provide the fixation belt 18 with superior thermal conductivity. As for the material for the surface layer as a release layer, which is for preventing toner offset, and/or ensuring that a sheet S of recording medium smoothly separates from the fixation belt 18, fluorine resin, such as those listed below, silicone resin, or the like, which is excellent in release properties and in heat resistance, may be used alone or in mixture.

Fluorine Resins:
Polytetrafluoroethylene (PTFE)
Tetrafluoroethylene-perfluoroalkylvinyl-ether copolyme) (PFA)
Tetrafluoroethylene-hexafluoropropylene copolymer (FEP)
Ethylenetetrafluoroethylene copolymer (ETFE)
Polychlorotrifluoroethylene (CTFE)
Polyvinylidenefluoride (PVDF), etc.

In this embodiment, PFA was used as the material for the release layer. As for the coating method, the substrative layer may be dipped in the PFA after its outward surface is etched, or the outward surface of the substrative layer may be powder-coated. Further, the fixation belt 18 may be fitted with a piece of tube made of one of the above-mentioned resins so that the outward surface is covered with the tube. Moreover, the substrative layer may be covered with a release layer formed in the form of a piece of tube in advance, after its outward surface is blasted and coated with an adhesive or a primer.

The fixation belt 18 in this embodiment has a laminar structure, and, in particular, has three layers. The substrative layer is made of a Ni alloy. It is 30 μm in thickness, and 30 mm in internal diameter. The intermediary layer is a resin layer, and is formed, on the outward surface of the substrative layer, of silicone rubber. In addition, the intermediary layer is 180 μm in thickness. The outermost layer is a release layer, and is formed, on the outward surface of the intermediary layer, of PFA (PFA tube). In addition, the release layer is 30 μm in thickness.

Pressure Roller 19

The pressure roller 19 is an elastic roller, and is made up of a metallic core 19a and an elastic layer 19b. The metallic core 19a is formed of a metallic substance, such as SUS, free-cutting steel containing sulphur (SUM), and Al. The elastic layer 19b is formed on the peripheral surface of the metallic core 19a, of an elastic solid rubber, an elastic sponge rubber, a foamed elastic rubber, or the like, in a manner to envelop the metallic core. More specifically, the elastic layer 19b is a solid rubber layer formed of a heat resistant rubber, such as silicone rubber and fluorine rubber. Further, in order to make the elastic layer 19b thermally more insulating, the silicone rubber is foamed. Further, hollow fillers (such as micro-balloons) were dispersed in the material for the elastic layer 19b to provide the elastic layer 19b with numerous minute gassy hollows, in order to provide the elastic layer 19b with a higher level of a thermally insulating effect.

By the way, the pressure roller 19 may be provided with a release layer, which is formed on the elastic layer 19b, of PFA resin, PTFE resin, or the like. In this embodiment, the pressure roller 19 is made up of the metallic core 19a formed of SUS, and the elastic layer 19b formed of an elastic solid silicone rubber. In addition, the pressure roller 19 is 25 mm in external diameter.

Heater 20

Figure 3:
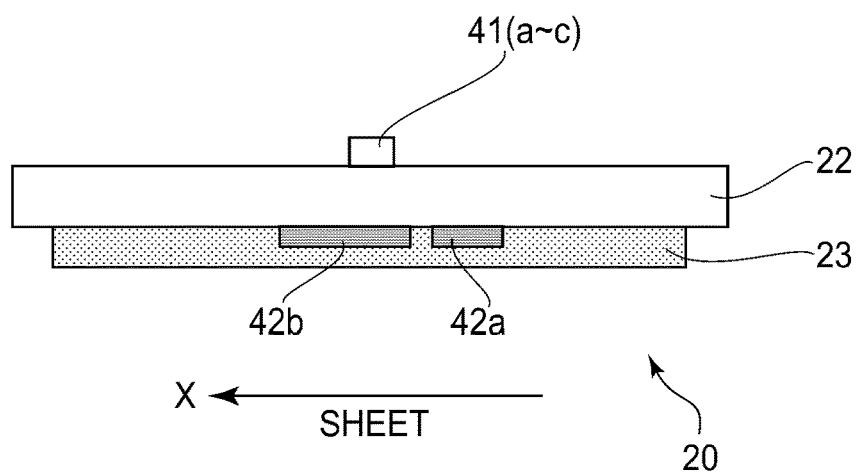
FIG. 3 is an enlarged schematic cross-sectional view of a heater of the fixing apparatus in the first embodiment.

FIG. 3 is a sectional view of the heater 20 in this embodiment, and shows the general structure of the heater 20. The heater 20 is made up of a substrate 22, and a heat generating layers 42a and 42b (collectively, heat generating layer 42, or heat generating resistor layer 42). The substrate 22 is in the form of a piece of a plate that is low in thermal capacity. The substrate 22 is formed of an insulative ceramic, such as alumina and aluminum nitride. The heat generating layer 42 is formed on the surface of the insulative ceramic substrate 22, of an electrically resistive substance, such as silver-palladium (Ad/Pd), Ruthenium oxide ($RuO_2$), and Tantalum nitride ($Ta_2N$), that generates heat as an electrical current is run through the heat generating layer 42. The heat generating resistor layer 42 is formed by screen printing, and is roughly 10 μm in thickness.

Here, a "lengthwise direction" means such a direction that is perpendicular to the direction X in which a sheet S of recording medium is conveyed. It is parallel to the axial line of the pressure roller 19, and to the lengthwise direction of the fixation nip N.

The side of the heater 20, which contacts the inward surface of the fixation belt 18, is covered with a protective layer 23 for protecting the heat generating resistor layer 42, to a thickness that can hardly affect the thermal conductivity between the heater 20 and the fixation belt 18. The protective layer 23 is desired to be as thin as possible as long as it can provide the heater 20 with satisfactory surface properties. In addition, the protective layer 23 is formed of glass, a fluorine resin, or the like.

Next, referring to FIG. 4, the method for supplying the heater 20 in this embodiment with electrical power is described. The fixing apparatus 16 in this embodiment is structured so that, in terms of the direction perpendicular to the recording medium conveyance direction X, the centerline of a sheet S of recording medium coincides with that of the recording medium conveyance passage, regardless of sheet size. O in FIG. 4 stands for this central referential line (theoretical line). In this embodiment, the heater 20 is provided with two heat generating resistor layers 42a and 42b, that is, the upstream and downstream heat generating resistor layers 42a and 42b in terms of the recording medium conveyance direction X. As first and second switches 43a and 43b, which are under the control of the control portion 200, are turned on, the two heat generating resistor layers 42a and 42b are made to generate heat by the electrical current flowed through the heat generating resistor layers 42a and 42b, by an AC voltage applied thereto from an electrical power source 44 (AC power source).

The two switches 43 (a and b) are turned on or off at a frequency in a range of several msec to several 100 msec to keep the temperature of the heater 20 at a preset level. More concretely, there are a couple of methods for controlling the temperature of the heater 20. One such method is to turn on the commercial AC voltage during specific periods that correspond to specific portions of the waveform of the voltage (i.e., duty ratio control), and the other method is to input a preset number of units (that corresponds to half of a waveform) of the voltage (i.e., wave number control). In this embodiment, the control method based on duty ratio (i.e., duty ratio control) was employed.

In terms of the lengthwise direction, the heat generating resistor layers 42a and 42b are nonuniform in width, being, therefore, nonuniform in electrical resistance. More specifically, both the heat generating resistor layers 42a and 42b have a center portion and end portions. The heat generating resistor layers 42a and 42b are different, however in that, in terms of the recording medium conveyance direction X, the center portion of the heat generating resistor layer 42b is wider than that of the layer 42a, and also in that the end portions of the layer 42a are shaped so that the heat generating resistor layer 42a is wider near the end portions and more narrow near the center thereof, being, therefore, smaller in electrical resistance at a center thereof, and the heat generating resistor layer 42b is more narrow near the end portions, and wider near a center portion thereof, being, therefore, greater in electrical at a center thereof. In other words, the heat generating resistor layer 42a is intended to heat primarily the center portion of the fixation nip N, whereas the layer 42b is intended to heat primarily the lengthwise end portions of the fixation nip N, since the narrower (in terms of left-right direction in FIG. 4) the heat generating resistor layer 42, the greater it is in electrical resistance (top-bottom direction in FIG. 4), being, therefore, greater in the amount of heat generation (i.e., becoming greater in temperature ($W=RI^2$) as long as the electrical current continues to flow in the top-bottom direction of FIG. 4.

Here, it is assumed that the duty ratio for driving the heat generating resistor layer 42a is Da, and that for heat generating resistor layer 42b is Db. In a case in which a sheet S of recording medium is conveyed in the landscape mode, both Da and Db are set to 70%. In comparison, in a case in which the sheet S is conveyed in the portrait mode, Da is set to 80%, and Db is set to 20%, making it possible to prevent the lengthwise end portions, that is, the out-of-sheet-passage portions, of the fixation belt 18 from becoming excessively high in temperature. That is, it is desired to control the frequency with which the heat generating resistors 42a and 42b, with which the heater 20 is provided, are made to generate heat. Conveying a sheet S of recording medium in the landscape mode, as shown in FIG. 4, corresponds to the conveyance of the widest sheet of recording medium that can be accommodated by the image forming apparatus (and, therefore, the fixing apparatus 16). Conveying a sheet S of recording medium in the mode attitude corresponds to the conveyance of the narrowest sheet of recording medium.

Driving of Fixing Apparatus

As the driving force from a motor M (driving force source), which is under the control of the control portion 200, is transmitted to the metallic core 19a of the pressure roller 19 through a driving force transmission mechanism (unshown), the pressure roller 19 is rotationally driven at a preset peripheral velocity in the counterclockwise direction indicated by an arrow mark R19 in FIG. 2. As the pressure roller 19 is rotationally driven, the fixation belt 18 is rotated in the direction indicated by an arrow mark R18 by the friction that occurs between the fixation belt 18 and the pressure roller 19 in the fixation nip N as the pressure roller 19 rotates.

Further, electrical power is supplied to the heat generating resistor layers 42a and 42b of the heater 20, with the use of the power supplying method described with reference to FIG. 4. Thus, the temperature of the heater 20 increases to a preset level (fixation temperature), and is kept at the preset level. More specifically, the temperature of the heater 20 is controlled by controlling the amount by which electrical power is supplied to the heat generating resistor layers 42a and 42b from the power source 44, based on the information regarding the temperatures detected by the temperature sensors 41a, 41b, and 41c.

While the temperature of the fixing apparatus 16 is kept at the preset fixation level, a sheet S of recording medium, which is bearing an unfixed toner image, is introduced into the fixing apparatus 16, and is conveyed through the fixation nip N while remaining pinched between the fixation belt 18 and the pressure roller 19. Thus, the unfixed toner image T, formed on the sheet S, is thermally fixed to the sheet S.

Image Reading Portion

Figure 5:
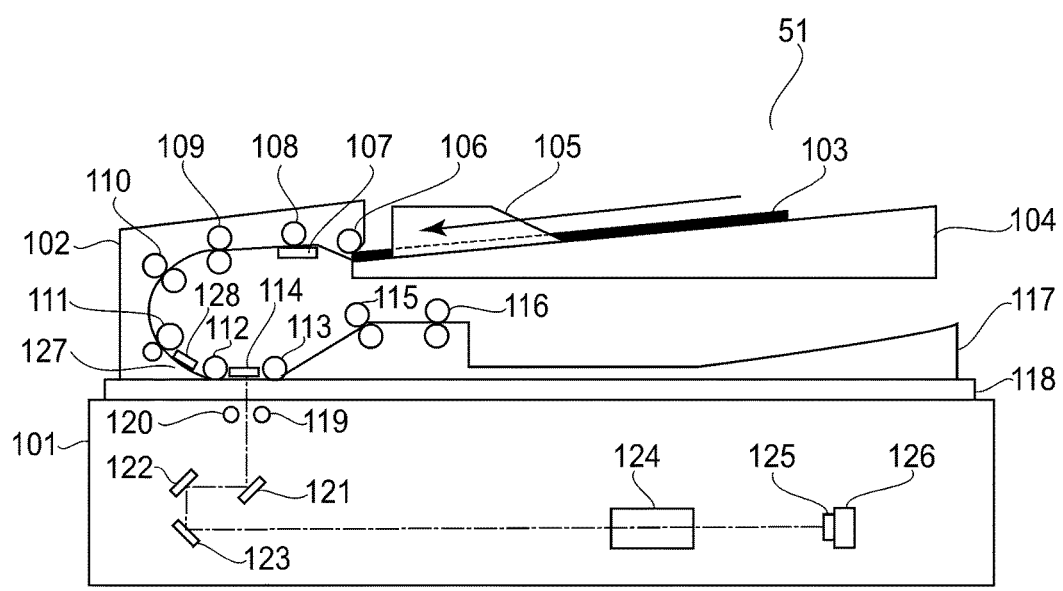
FIG. 5 is a schematic sectional view of an original image reading portion of the image forming apparatus, and is for describing the structure of the original image reading portion.

FIG. 5 is a schematic sectional view of the image reading portion 51 in this embodiment. The image reading portion 51 is made up of an image reading apparatus 101 and an automatic document feeder 102. The automatic document feeder 102 has an original feeder tray 104, a conveying portion for conveying sheets of an original (document) 103, and a delivery tray 117. The original 103 is placed in the original feeder tray 104, and is then it is conveyed from the original feeder tray 104 to a separating portion (combination of a separation pad 107 and a separation roller 108) by a pickup roller 106. The combination of the separation pad 107 and the separation roller 108 separates the topmost sheet from the rest of the sheets in the original feeder tray 104.

The original feeder tray 104 is provided with a pair of lateral plates 105 for controlling the lateral movement of the documents (originals) 103. Thus, as originals 103 are placed on the original feeder tray 104, the lateral edges of the originals 103 come into contact with the lateral plates 105. Therefore, the originals 103 are prevented from being conveyed askew. After being separated from the rest of sheets in the tray 104, each original 103 is conveyed to the first pair of registration rollers 109, by which it is corrected in attitude if it arrives askew. Then, the original 103 is conveyed by a second pair of registration rollers 110, a first conveyance roller 111, and a second registration roller 112, to a position in which it is read.

An original detection flag 127 of an original detection sensor 128, is disposed between the first conveyance roller 111 and the second conveyance roller 112. The timing with which reading of the original 103 is to be started is controlled based on the result of the detection of the flag 127. After being conveyed through the reading position, the original 103 is conveyed further by a third conveyance roller 113 an a fourth conveyance roller 114, and is then discharged into the delivery tray 117 by a pair of discharge rollers 116.

While an original 103 is moved on the top side of the reading position, which is between the second conveyance roller 112 and the third conveyance roller 113, it is illuminated by the light projected thereupon from a pair of light sources 119 and 120. Then, the light reflected by the original 103 goes through a plate 118 of glass (glass platen), is deflected by mirrors 121, 122, and 123, and is guided to a focal lens 124, by which it is made to converge on a line sensor 125 made up of photoelectric elements arranged in a straight line. Then, the light is converted into an electrical signal by the line sensor 125, and then, is converted into a digital signal by a signal processing circuit 125.

Control Portion

Figure 6:
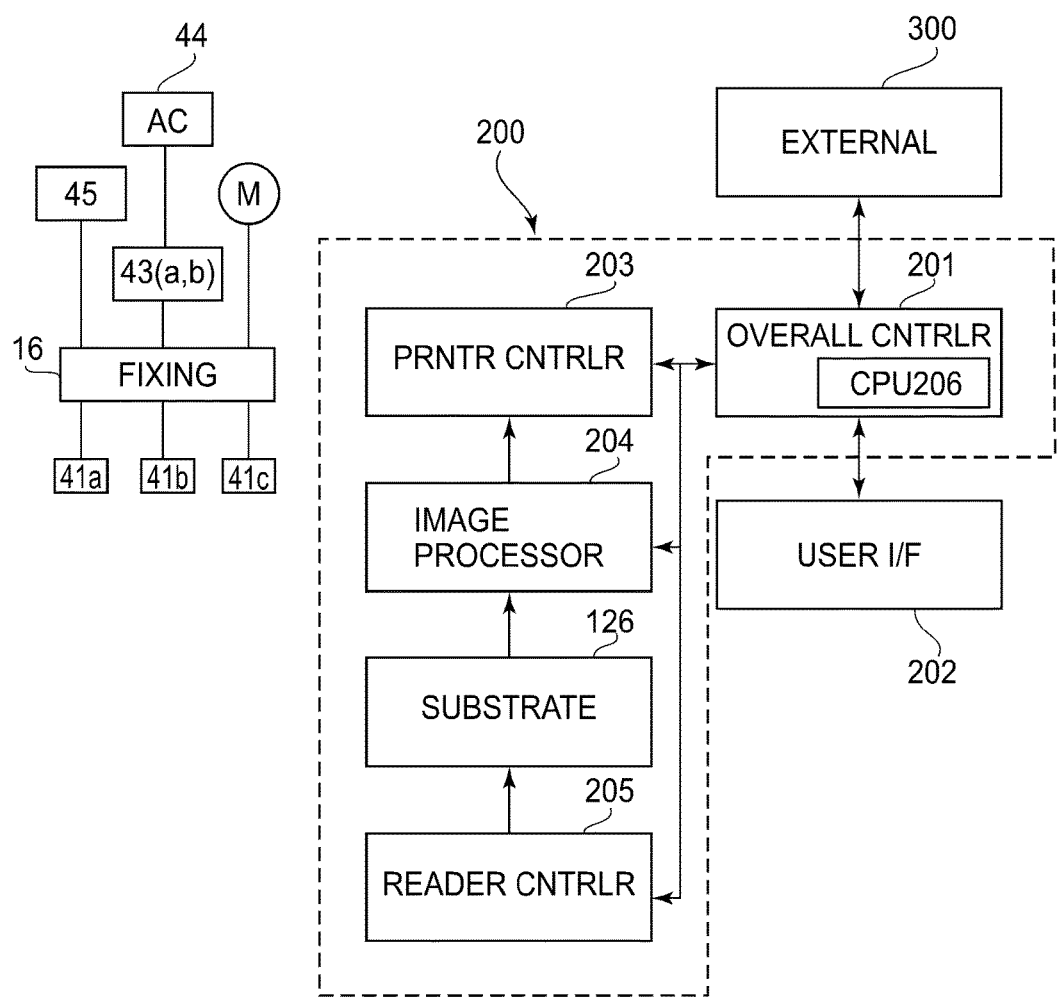
FIG. 6 is a block diagram of a control system of the image forming apparatus.

FIG. 6 is a block diagram of the control system. The control portion 200 has a general control portion 201, a printer controlling portion 203, an image processing portion 204, a signal processing circuit 126, and an original reading portion controlling portion 205.

The general control portion 201 is provided with a central processing unit 206, and integrally controls the control panel 202 (user interface), the printer controlling portion 203, and the original reading portion controlling portion 205. The printer controlling portion 203 is in connection to various portions of the printing portion 50 that need to be controlled. FIG. 6 shows only the fixing apparatus 16 of the image forming apparatus, among the various portions that are in connection to the control portion 200. The original reading portion controlling portion 205 is in connection to various portions of the original reading portion 51 that need to be driven and controlled. FIG. 6 shows only the signal processing circuit 126, among various portions of the original reading portion 51.

Portions of Image Heating Apparatus that Characterize this Embodiment

Figure 7:
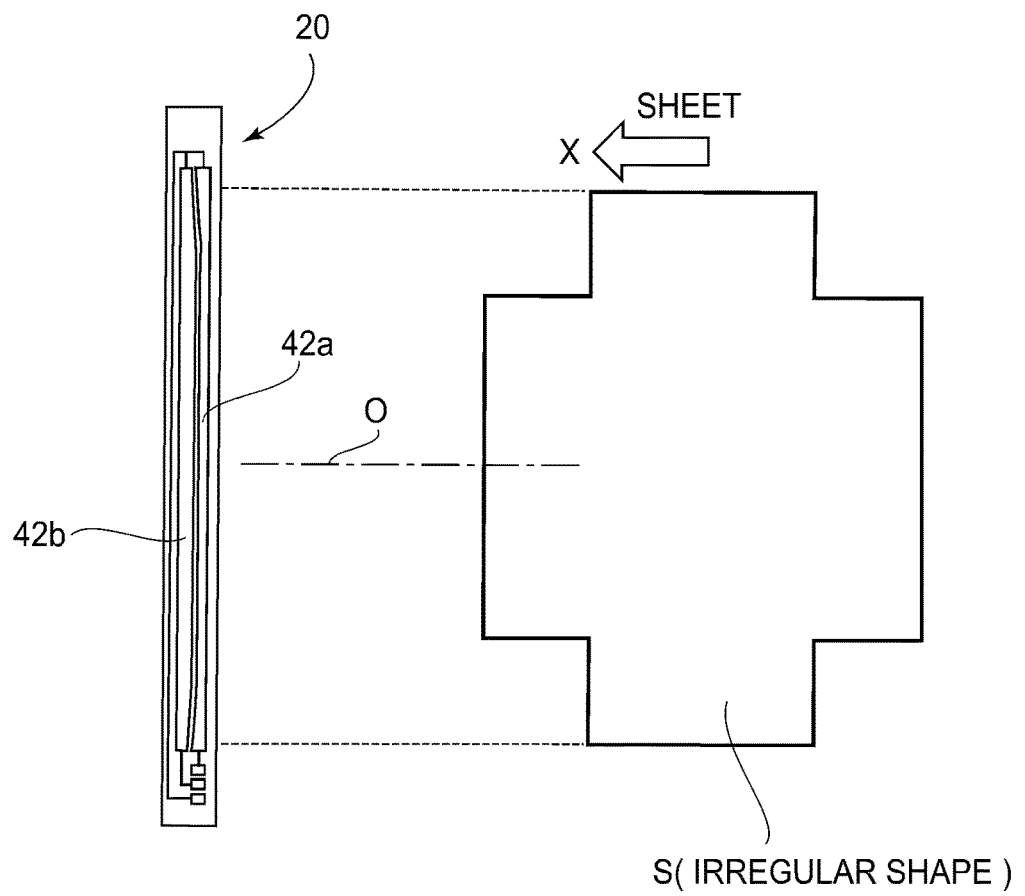
FIG. 7 is a schematic drawing of a combination of the heater of the fixing apparatus in the first embodiment, and an unusually shaped sheet of recording medium, which is for describing the first embodiment.

In this embodiment, sheets S of recording medium, which are unusually shaped (i.e., a nonrectangular sheet that results as box is unfolded on a flat surface) as shown on the right-hand side of FIG. 7, for example, are read in advance by the original reading portion 51, to acquire their shape, and are then placed in the recording medium holding portion 100. Then, the image formation process (image formation condition) of the printing portion 50 is controlled according to the shape of each sheet S of recording medium. Thus, it is possible to obtain high quality products (prints) regardless of the shape of the sheet S of recording medium. By the way, in order to describe the positional relationship between a sheet S of recording medium and heater 20 in terms of a widthwise direction, a schematic drawing of the heater 200 was added to the left portion of FIG. 7.

Figure 8:
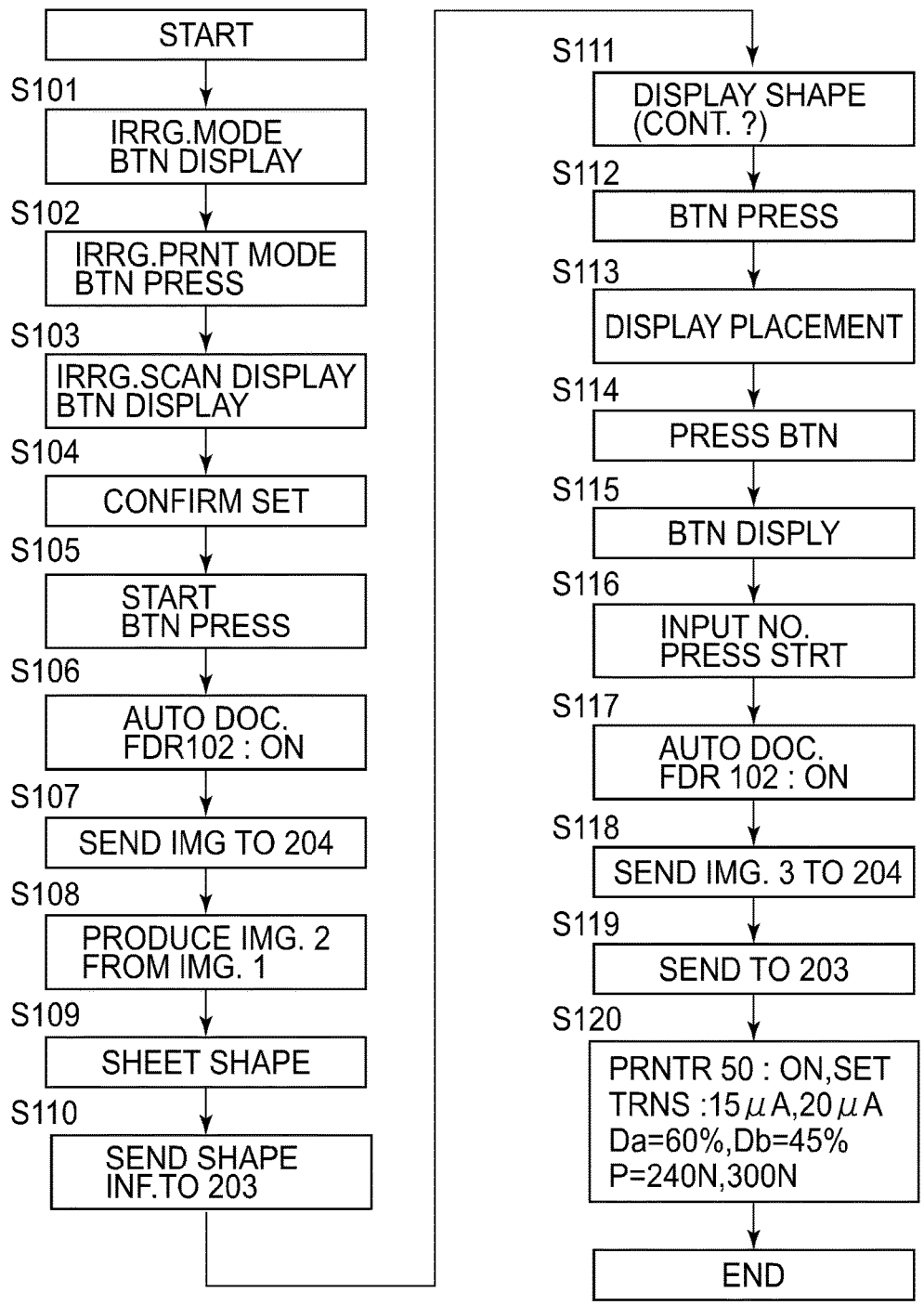
FIG. 8 is a flowchart of an operational sequence of the image forming apparatus in the first embodiment.

FIG. 8 is a flowchart of the operational sequence of the CPU 206 of the general control portion 201 of the control portion 200 that controls the image forming apparatus in this embodiment.

(1) In a case in which a user wants to print an image on an unusually shaped sheet S of recording medium, such as the one shown on the right portion of FIG. 7, the user is to select an "irregular sheet print mode" from the main menu (unshown) on the screen (liquid crystal touch panel) of the control panel 202. As this printing mode is selected, the CPU 206 displays a combination of a button 251 for an "unusually shaped material printing mode" (or, as shown in part (a) of FIG. 9, an "irregular sheet print" mode) and a cancel button, on the display screen 202B, as shown in part (a) of FIG. 9 (Step S101).

(2) As the user presses the button 251 (Step S102), the CPU 206 displays a combination of an instruction (prompt), and a reading start button 252, and a cancel button, such as the one shown in part (b) of FIG. 9 on the display screen 202B (Step S103). That is, the CPU 206 displays the combination of the instruction that reads "scan material shape. Place material on a preset area of auto document feeder 1 (that hereafter will be abbreviated as "feeder"), in such attitude that a surface having an image to be printed faces (or, as shown in part (b) of FIG. 9, an instruction that reads "shape scanning place doc, face-up on doc. feeder," the reading start button 252, and the cancel button (Step S103).

The user is to follow the instruction, in that the user is to set an unusually shaped sheet S of recording medium, that is, the unusually shaped material shown in FIG. 7, on the area of the feeder 102, where the original 103 is in FIG. 5.

If multiple unusually shaped sheets S of recording medium are the same in shape, the operator has to set only one of the sheets. In a case in which multiple groups of sheets S of recording medium are used, and each group is made up of multiple sheets that are different in shape, the user has to set only one group. In a case in which multiple sheets of recording medium, which are different in shape, are used, all the sheets S have to be individually set. The CPU 206 confirms whether or not the sheets S of recording medium have been set on the feeder 102 with the use of a detecting means (unshown) (Step S104).

(3) Next, the user is to press the "reading start" button 252 (Step S105). As the user presses the button 251, the CPU 206 activates the feeder 102 by way of the original reading portion controlling portion 205 (Step S106). Thus, the sheet S of recording medium sent from the feeder 102 begins to be scanned (read) by the image reading apparatus 101. By the way, if the CPU 206 cannot confirm the setting of the sheets S on the feeder 102, it does not activate the feeder 102.

The image (1) (first information of image) of the sheet S of recording medium scanned by the image reading apparatus 101 is sent to the image processing portion 204 (Step S107). The image processing portion 204 extracts the image (2) (second information of image), that is, edge components of the image (1) (Step S108). Further, the image processing portion 204 extracts, from the image (2), the information regarding the shape of the sheet S (Step S109), and transmits the information to the printer controlling portion 203 (Step S110).

In this embodiment, a sheet of recording medium, on which a toner image is to be formed, is set in the original image reading portion 51, and is read to obtain the second information (of sheet), before a toner image is formed on the sheet. Then, the image processing portion 204 obtains the information regarding the shape of the sheet S by processing the second information. That is, the image processing portion 204 is the means for processing the second information to obtain the shape of the sheet S.

(4) Next, the CPU 206 displays a message that reads "information regarding shape of material has been obtained" (or, as shown in part (c) of FIG. 9, shape: acquired continue to copy"), and an image formation start button 253, on the screen (Step S111).

In a case in which a sheet S of recording medium set in Step S103 is too thick and/or too rigid to be moved through the feeder 102, the following procedure is to be followed. That is, the user is to lift the feeder 102, and place each sheet S on the glass platen 118, so that the sheet S can be individually scanned. In such a case, the combination of the light sources 119 and 120, mirrors 121, 122 and 123, focal lens 124, and line sensor 125 is moved in the crosswise direction of the drawing to scan the sheet S.

As the user presses the print start button 253 (Step S112), the CPU 206 displays a combination of an instruction, an "OK" button 254, and a cancel button, on the display screen 202B, as shown in part (d) of FIG. 9 (Step S113). More specifically, the CPU 206 displays the combination of an instruction that read, "rotate scanned material by 180° C., turn the material upside down, and place the material in the recording medium holding portion so that the surface of the material, on which an image is to be formed, faces upward" (or, as shown in part (d) of FIG. 9, an instruction that reads "reverse & face-up set"), an OK button 254, and a cancel button. Since the scanned sheet S is in the delivery tray 117 or on the glass platen 118, with its surface, on which an image is to be formed, facing downward, the operator is to follow the instruction displayed on the screen 202 to make the surface of the sheet S, on which an image is to be formed, face upward.

(5) As the user places the sheet S in the recording medium holding portion 10 as instructed, and presses the OK button 254 (Step S114), the CPU 206 displays a combination of an instruction, a start reading button 255, and a cancel button, such as the one shown in part (e) of FIG. 9, on the display screen 202B. That is, the CPU displays the combination of an instruction that reads "scan image to be printed" (or, as shown in part (e) of FIG. 9, "scan"), a print count window, the start reading button 255, and a cancel button (Step S115).

The user is to set the original 103 to be copied, and input the desired print count with the use of the inputting portion 202A. After the user inputs the desired print count, the value of the input count is displayed in the print count window. Then, the user is to press the start reading button 255 (Step S116). Then, the CPU 206 activates the feeder 102, thereby causing the image reading apparatus 101 to begin scanning (reading) the original sent thereto by the feeder 102. Then, the image (3) of the original, which was obtained by the image reading apparatus 101 through the process of scanning the original 103, is sent to the image processing portion 204 (Step S118).

The image processing portion 204 has the information regarding the shape of the sheet S of recording medium that was scanned in Step S107, in its memory (unshown). Thus, it processes the image (3) according to the shape of the sheet S (to provide margins, or the like), and sends the results of the processing to the printer controlling portion 203 (Step S119).

(6) As soon as Step S119 is completed, the CPU 206 makes the printing portion 50 begin to operate (Step S120) to form a toner image on the transfer belt 8 through the processes, such as those described above. As soon as the toner image is formed on the transfer belt 8, a sheet of S of recording medium is conveyed to the secondary transferring nip 14 with a preset timing. To the secondary transfer roller 13, a constant current bias, that is, a bias that is stable in current value, is applied from a power source 46 (FIG. 1). The reason why a bias is applied to provide constant current is to ensure that the electrical force for transferring a toner image T onto a sheet S of recording medium remains stable even if the transfer belt 8 and the secondary transfer roller 13 reduce in electrical resistance due to their repeated usage.

The printer controlling portion 203 controls the amount by which electrical current is flowed to the secondary transfer roller 13 from the power source 46, in synchronism with the progression of the passage of a sheet S of recording medium through the secondary transfer nip 14, as shown in FIG. 10. That is, while the portion of the sheet S, which is narrower than the other portions of the sheet S, moves through the secondary transfer nip 14, the printer controlling portion 203 reduces the current value to 15 µA, whereas, while the portion of the sheet S, which is wider than the other portions of the sheet S, moves through the secondary transfer nip 14, the printer controlling portion 203 keeps the current value greater at 20 µA.

Thus, it is possible to prevent the problems in which, as the portion of a sheet S of recording medium, which is narrower (in terms of vertical direction in FIG. 10) than the other portions of the sheet S, is conveyed through the secondary transfer nip 14, the electrical current becomes excessive, and, therefore, the toner image T is disturbed by the electrical discharge triggered by the excessive amount of current. It is also possible to prevent the problem that while the portion of the sheet S, which is wider than the other portions of the sheet S, is conveyed through the secondary transfer nip 14, the toner image T fails to transfer onto the sheet S because of the insufficiency in the amount of electrical current. That is, because the printer controlling portion 203 controls the power source 46 in the amount of electrical current flowed by the power source 46, the toner image T is transferred onto a sheet S of recording medium by a proper amount of electrical current, even if the sheet S is unusual in shape.

At the same time that the printer controlling portion 203 activates the printing portion 50 in Step S120, it sets the duty ratio Da for the heat generating resistor layer 42a of the fixing apparatus 16 to 60%. Further, it sets the duty ratio Db for the heat generating resistor layer 42b to 45%.

These settings are decided based on the information regarding the shape of a sheet S of recording medium. That is, when the ratio of the portion of the sheet S, which is being moved through the secondary transfer nip 14, to the width of the heat generating resistor layers 42, in terms of the lengthwise direction of the secondary transfer nip 14, is small, a lesser amount of heat is given to the secondary transfer nip 14, whereas, when the ratio is greater, a greater amount of heat is given. With the use of this control, even if a sheet S of recording medium, on which a toner image T is to be formed, is unusual in shape, it is uniformly heated, and, therefore, it is possible to prevent the problem that, as a toner image T is conveyed through the fixation nip N, it becomes nonuniform in gloss due to the nonuniformity in the amount of heat given thereto.

Further, the printer controlling portion 203 changes the amount by which pressure is applied to the fixation nip N by the pressure applying mechanism 45 (FIG. 6), in synchronism with the timing with which an unusually shaped sheet S of recording medium is conveyed through the fixation nip N, as shown in FIG. 11. More concretely, while the narrow portion of the sheet S moves through the fixation nip N, the printer controlling portion 203 keeps the amount of pressure at 240 N, whereas, while the wider portion of the sheet S moves through the fixation nip N, the printer controlling portion 203 keeps the amount of pressure at 300 N. Thus, even if an unusually shaped sheet S of recording medium is conveyed through the fixation nip N, the pressure applied to the sheet S remains stable. Therefore, it is possible to prevent the problem that a toner image T becomes nonuniform in gloss due to the nonuniformity in the pressure between the sheet S (toner image T) and the fixation belt 18.

As described above, if the image processing portion 204, as the means for processing the information regarding the shape of a sheet of recording medium, detects that the sheet S is not in an ordinary rectangular shape, the printer controlling portion 203 controls the image forming apparatus in the following manner. That is, the printer controlling portion 203 changes the preset amount by which voltage is applied to the secondary transfer roller 13, the preset amount by which current is flowed through the secondary transfer roller 13, and the preset amount by which a combination of heat and pressure, heat, or pressure is applied to the fixation nip N, according to the information regarding the detected shape of the sheet S. Therefore, even when a sheet S of recording medium, which does not have an ordinary rectangular shape, is used as recording medium, it is possible to easily set proper transfer conditions and/or fixation conditions.

The printer controlling portion 203 controls the heater 20 of the fixing apparatus 16, in heat distribution, in terms of the direction that is perpendicular to the recording medium conveyance direction, based on the information regarding the aforementioned detected shape of the sheet S of recording medium, in order to properly set fixation conditions for each of various sheets S of recording medium that are different in shape, thickness, and/or a like property. The printer controlling portion 203 controls the heater 20 in the above-mentioned heat distribution, by controlling the power supply to the heat generating resistor layers 24 (a and b) of the fixing apparatus 16. The fixing apparatus 16 is provided with multiple (three in this embodiment) temperature detecting means 41 (a to c), which are different in position in terms of the direction perpendicular to the recording medium conveyance direction X. The printer controlling portion 203 controls the heater 20 in the heat distribution with the use of at least one of these temperature detecting means 41.

(7) As soon as the image formation on a preset number of sheets S of recording medium is completed, the CPU 206 stops the image forming apparatus (End).

Through the operational steps described above, the fixation conditions can be easily set even for sheets of recording medium that are not in the form of an ordinary rectangular shape.

Embodiment 2

The image forming apparatus in this embodiment is roughly the same as the one in the first embodiment, except for the following features that characterize the apparatus. FIG. 12 is a top view of the fixing apparatus 16 in this embodiment. FIG. 12 does not show the nonessential components of the fixing apparatus 16. The heat distribution of the fixation belt 18, in terms of its widthwise direction (lengthwise direction), is detected by the temperature detecting means 41a, 41b, and 41c. Based on the results of the detection of this heat distribution, the printer controlling portion 203 controls the fixing apparatus 16, in particular, in the duty ratios Da and Db.

Three cooling fans Fa, Fb, and Fc (cooling means), which are under the control of the control portion 200, are disposed in the adjacencies of the center portion and lengthwise end portions of fixation belt 18, one for one, in terms of the widthwise direction of the belt 18.

The printer controlling portion 203 adjusts the power supply in the duty ratio Da and Db in order to deal with various sheets S of recording medium that are different in shape. If the printer controlling portion 203 determines that the adjustment in the duty ratios Da and Db is failing to keep the temperature distribution of the heater 20 in a preset range in terms of the widthwise direction of the fixation belt 18, however, the printer controlling portion 203 cools the fixation belt 18 with the use of the fans Fa, Fb, and Fc.

For example, if the temperature detecting means 41a, 41b, and 41c that the lengthwise end portions (top and bottom portions in FIG. 12) of the fixation belt 18 are greater than a desired level, the printer controlling portion 203 activates the fans Fa and Fb, which are in the adjacencies of the lengthwise end portions of the fixation belt 18, to cool the lengthwise end portions of the fixation belt 18. Further, if a sheet S of recording medium, such as the one shown in FIG. 12, which has a hole Sa in the center, is used as the recording medium, the printer controlling portion 203 sets the duty ratios Da and Db to 50% and 70%, respectively, and drives the fan Fb.

Also in this embodiment, the printer controlling portion 203 controls the heater 20 of the fixing apparatus 16 in the heat distribution, in terms of the direction perpendicular to the recording medium conveyance direction X, according to the information regarding the detected shape of a sheet S of recording medium. More specifically, the printer controlling portion 203 controls the above-mentioned heat distribution, by controlling the power supply to the heat generating resistors 42 (a and b) of the fixing apparatus 16. Further, the printer controlling portion 203 controls the above-mentioned heat distribution also by controlling the cooling means F (a to c) the fixing apparatus 16.

The fixing apparatus 16 is provided with multiple (three in this embodiment) temperature detecting means 41 (a to c), which are different in position in terms of the direction perpendicular to the recording medium conveyance direction X. The printer controlling portion 203 controls the heater 20 in the heat distribution with the use of at least one of these temperature detecting means 41.

Therefore, the fixation conditions can be easily set even for sheets S of recording medium that are not in the form of an ordinary rectangular shape.

Embodiment 3

The image forming apparatus 16 in this embodiment is also roughly the same as the one in the first embodiment. The image forming apparatus 16 of this embodiment is different, however, in operation from the one in the first embodiment. Thus, the operation of this image forming apparatus 16 is described with reference to a case in which a recording medium, such as an envelope shown in FIG. 13, which has areas having two layers to five layers of recording medium (paper), is used in place of an ordinary sheet S of recording medium, is described. The portion of an envelope that has two layers of paper (recording medium), and the portions the envelope that have five layers of paper (recording medium), are substantially different in thickness. Therefore, a substantial step is present between the two portions. Thus, if images are formed on a large number of envelopes, or the like, the components of the fixing apparatus 16, which are in the adjacencies of the secondary transfer nip 14, and also, in the adjacencies of the fixation nip N, wear faster across the portions that correspond to portions in which five layers of recording medium (paper) overlap, than other portions of the envelope. This has been the reason the fixation belt 18, the pressure roller 19, etc., of the fixing apparatus 16 had to be replaced more frequently if envelopes, or the like, were used as a recording medium than when ordinary sheets of recording medium were used.

FIG. 14 is a flowchart of the control sequence of the CPU 206 of the general control portion 200 that controls the image forming apparatus in this embodiment.

(1) When a user wants to use envelopes as recording medium, the user is to select the "envelope printing mode" from the main menu (unshown) on the screen (liquid crystal touch screen) of the control panel 202. As the "envelope printing mode" is selected, the CPU 206 displays a combination of an "envelope print mode" selection button 256 and an envelope printing mode cancel button on the display screen 202B (Step S201), as shown in part (a) of FIG. 15.

(2) As the user presses the button 256 (Step S202), the CPU 206 displays a combination of an instruction, a reading start OK button 267, and a cancel button, such as the one shown in part (b) of FIG. 15, on the display screen 202B. That is, the CPU 206 displays the combination of the instruction "Scan envelope for its shape. Pick one envelope, and place it on preset position on auto document feeder 102, in such attitude that side (back surface) having overlapping portion faces upward", (or "Envelope Shape Scan, Place Envelope Face-Down", as shown in part (b) of FIG 15), a reading start button 257, and cancel button, on the display screen 202B (Step S203).

As the user sets a recording medium S, which is an envelope, on the portion of the feeder 102, where the original 103 is in FIG. 5, following the instruction, the CPU 206 confirms whether or not the recording medium S is in the feeder 102 with the use of a detecting means (unshown) (Step S204). It is assumed here that the multiple recording mediums S (envelopes) are the same.

(3) Then, the user is to press the "start reading" button 257 (Step S205). As the user presses the button 257, the CPU 206 activates the feeder 102 by way of the original reading portion controlling portion 205 (Step S206). Thus, the recording medium S fed by the feeder 102 is scanned (read) by the image reading apparatus 101. By the way, if the CPU 206 cannot confirm that the recording medium S has been set in the feeder 102, it does not activate the feeder 102.

The image (2) of the recording medium S obtained by the scanning of the recording medium S by the image reading apparatus 101 is sent to the image processing portion 204 (Step S207). The image processing portion 204 makes the image (12) of the contour of the recording medium S from the image (2) by extracting the edge component of the image (2) (Step S208), and obtains the information regarding the shape of the recording medium S from the image (12) (Step S209). Then, the image processing portion 204 sends the information to the printer controlling portion 203 (Step S210). This information regarding the shape of the recording medium S includes the information regarding the border lines between the two layer portions of the envelope and the other portions, which are indicated by solid lines in FIG. 13, in addition to the information regarding the contour of the envelope.

The CPU 206 determines the type of envelope of the recording medium S, of the commercially available envelopes, with reference to the data base stored in a memory (unshown) (Step S211). The CPU 206 also uses the information regarding the border among the areas of the envelope, at which the envelope material (paper) overlaps.

(4) Thereafter, the CPU 206 displays a combination of a message "Envelope shape was obtained", (or "Shape: Acquired, Continue to Print" in part (c) of FIG. 15), a print start button 258, and a cancel button, on the display screen 202B, as shown in part (c) of FIG. 15 (Step S212).

The recording medium S, which is the envelope fed into the image reading apparatus 101 and scanned by the apparatus 101, is in the delivery tray 117, with its multilayered portions facing downward. By the way, in a case in which the recording medium S, which is an envelope, is such a recording medium that is impossible to be fed into the image reading apparatus 101 by the feeder 102, it has only to be manually placed on the glass platen 118 to be scanned. In such a case, the recording medium S is placed on the glass platen 118 in such an attitude that its address placement surface faces upward, and its multilayer portions face downward.

As the user presses the printing start button (Step S213), the CPU 206 displays a combination of a question and three buttons, such as those shown in part (d) of FIG. 15, on the display screen 202B (Step S214). That is, the CPU 206 displays the combination of the question "which side of recording medium", an address side button 259, a backside button 260, and a cancel button (or "Select, " and three buttons including "Front, " "Back," "Cancel", as shown in part (d) of FIG. 15).

(5) As the user presses the address side button 259, the CPU 206 determines in Step S215 that the answer is Y, and displays an instruction "Place envelope in recording medium holding portion without changing envelope in attitude" (or Keep Orientation" as shown in part (e) of FIG. 15) on the display screen 202B, as shown in part (e) of FIG. 15 (Step S216).

If the user presses a back-side button 260, the CPU 206 determines in Step S125 that the answer is N, and displays an instruction "Take envelope out, turn envelope 180° without turning it upside down, and place envelope in recording medium holding portion" (or "Reverse Left-Right, " as shown in part (f) of FIG. 15), on the display screen 202B as shown in part (f) of FIG. 15 (Step S217).

In Steps S216 or S217, a set completion button 261 or a cancel button 262 is pressed by the user. The CPU 206 displays a combination of an instruction "Transmit printing job" (or "Send Job," in part (g) of FIG. 15), an OK button 263, and a cancel button, on the display screen 202B as shown in part (g) of FIG. 15 (Step S218).

The user is to press the OK button 263 to initiate the transmission of the printing job. As the OK button 263 is pressed, the general control portion 201 puts the printing portion 50 on standby (Step S219), and receives, as an external input, the printing job that the user transmitted by operating the external apparatus 300 such as a computer (Step S220). As the general control portion 201 receives the printing job, it communicates with the printer controlling portion 203, and starts a printing operation (Step S221).

(6) FIG. 16 is a flowchart of the subordinate sequence in Step S221 to be carried out by the printer controlling portion 203, and is for describing in detail, Step S221, which characterizes this embodiment.

The printer controlling portion 203 receives the information regarding the print count (integer) of the printing job from the general control portion 201 (Step S301). Then, the printer controlling portion 203 determines whether or not the print count is no more than 100 (Step S302). If the user chooses Y in Step S302, the printer controlling portion 203 prints the desired image on the selected recording medium until the desired number (no more than 100) of product is outputted (Step S303), and ends the printing operation. If the answer in Step S302 is N, the printer controlling portion 203 outputs the first 100 products, and deducts 100 from the desired print count (Step S304). Then, the printer controlling portion 203 communicates with the image processing portion 204 by way of the general control portion 201, and horizontally turns by 180 degrees the image to be written (Step S305).

Next, the CPU 206 displays a combination of an instruction "Take envelope out, horizontally rotate envelope by 180°, and reset envelope"(or "Remove, Rotate & Reverse Left-Right," as shown in part (h) of FIG. 15), a setting completion button 264, and a cancel button, on the display screen 202B, as shown in part (h) of FIG. 15 (Step S306). If the user presses the "setting completion" button 264 (Step S307), the CPU 206 returns to Step S302.

By following the subordinate sequence described above, the user can place the envelopes in the feeder 102 in such a manner that the multilayered portion of the envelope is alternately placed on the left and right sides of the feeder 102. Thus, it is possible to prevent the problem that certain portions of the transfer belt 8, the secondary transfer roller 13, the backup roller 9, the fixation belt 18, the pressure roller 19, etc., are subjected to an excessive amount of load. Therefore, it is possible to extend the life expectancy of these components.

In this embodiment, the above-mentioned effect was obtained by rotating an envelope. The same effect can also be obtained, however, by displacing an envelope in the widthwise direction relative to the recording medium holding portion 10.

The structure of the image forming apparatus 16 in this embodiment can be summarized as follows. The image forming apparatus 16 is provided with the recording medium holding portion 10 for supplying the transferring means with recording mediums, and the display screen 202B for giving the user an instruction about how recording mediums are to be set in the recording medium holding portion 10.

In a case in which the printer controlling portion 203 determines, based on the information from the image processing portion 204 as a shape information processing means, that recording mediums are envelopes, the printer controlling portion 203 displays the following message on the display screen 202B, based on the multilayered area count. That is, the message is for preventing the problem that envelopes are set in the recording medium holding portion 10 in such a manner that all the multilayered portions vertically align on a single spot, in terms of the direction perpendicular to the direction in which the recoding medium is conveyed in the transferring means and/or fixing means. More concretely, the printer controlling portion 203 displays a message that instructs the user to change recording mediums (envelopes) in orientation and/or position relative to the recording medium holding portion 10, in terms of the recording medium conveyance direction X.

By following this message, it is possible to obtain an additional effect, that is, an effect that various members of the transferring means, and those of the fixing means, can be extended in the interval with which they need to be replaced.

Embodiment 4

The user is allowed to input, into the control portion 200, the information regarding the specification of the recording medium S to be used, by way of the control panel 202 and an external device 300. In such a case, the control panel 202 and the external device 300 are means through which the control portion 200 obtains the specification of the recording medium S. Further, the recording medium passage from the recording medium holding portion 10 to the secondary transfer nip N is provided with the means (unshown) for obtaining the specifications (thickness, basis weight, etc.). The detected information is inputted into the control portion 200. Therefore, the control portion 200 in the first to third embodiment can control the printing portion 50 in the image formation conditions, based on both the specification (thickness, basis weight) and shape of the recording medium to be used for image formation.

The characteristic structural feature of the image forming apparatuses in the first to fourth embodiments can be summarized as follows. The image forming apparatuses have the image forming means 50 for forming an image on a sheet S of recording medium, the reading means 51 for reading the shape of the sheet S on which an image is to be formed, and the controlling means 200 that controls the image formation conditions for the image forming means 50, based on the shape of the sheet S obtained by the reading means 51.

The image forming means 50 has the transferring means 13 that transfers the image, formed on the image bearing member 8, onto the sheet S. The image formation conditions, which the controlling means 200 controls, are the transfer conditions for the transferring means 13. The image forming means 50 has the fixing means 16, which fixes the image formed on the sheet S. The image formation conditions, which the controlling means 200 controls, are the fixation conditions for the fixing means 16. The reading means 51 also has the function of reading the original, and has a means for obtaining the specification (basis weight) of the sheet S. The control portion 200 controls the image formation conditions based on both the shape and the specification of the sheet S.

Each of the above-mentioned image forming apparatuses has the recording medium holding portion 10 in which the sheet S is set, the image forming means 50, which forms an image on the sheet S conveyed from the recording medium holding portion 10, and reading means 51, which reads the shape of the sheet S on which an image is to be formed. Further, it has the informing means 202B (display screen), on which the method for setting the sheet S in the recording medium holding portion 10 according to the shape of the sheet S obtained by the reading means 51 is displayed. The reading means 51 has also the function of reading an original. The controlling means 200 has a means for obtaining the specification (basis weight) of the sheet S, and controls the image formation conditions, based on both the shape and the specification of the sheet S.

Miscellanies (1) The image bearing member onto which a toner image is transferred is not limited to an image bearing member, onto which a toner image is transferred from the first image bearing member. It may be such a member as an electrophotographic photosensitive member, an electrostatically recordable dielectric member, and a magnetically recordable magnetic member, on which a latent image can be formed, and can be developed into a toner image with the use of developer, and from which the formed toner image can be transferred onto the final recording medium.

(2) An image forming apparatus with which the present invention is compatible is not limited to a full-color image forming apparatus such as those in the preceding embodiments. That is, the present invention is also compatible with an image forming apparatus for forming a monochromatic image. Further, an image forming method with which the present invention is compatible is not limited to an electrophotographic method. That is, the present invention is also compatible with an image forming apparatus of the so-called transfer type, which uses a recording method other than an electrophotographic method. For example, the present invention is also compatible with an image forming apparatus of the so-called transfer type, which forms a toner image with the use of an electrostatic recording method, a magnetic recording method, or the like.

(3) A fixing apparatus to which the present invention is applicable is not limited to such a fixing apparatus as the fixing apparatus 16 in the preceding embodiments that fixes a toner image to recording medium with the use of a combination of heat and pressure. That is, the present invention is also applicable to an apparatus that fixes a toner image with the use of heat or pressure.

(4) In the preceding embodiments, the fixing apparatus 16 was an apparatus for fixing an unfixed toner image T formed on recording medium, by heating the toner image T. These embodiments are not intended to limit, however, the present invention in scope in terms of the type of fixing apparatus to which the present invention is applicable. For example, the present invention is also applicable to an apparatus for reheating a toner image that has been temporarily fixed to recording medium, to increase the toner image in glossiness (this type of apparatus also is referred to as fixing apparatus).

(5) The heating member for heating a rotational member for heating a toner image formed on recording medium, which is compatible with the present invention, is not limited to the ceramic heater 20. That is, the present invention is also applicable to a fixing apparatus structured to employ a heating means based on electromagnetic induction, a halogen heater, an infrared lamp, a nickel-chrome wire heater, or the like of the internal or external type. Further, the present invention can also be applicable to apparatuses structured so that their pressure roller 19 is provided with a heating member for heating the pressure roller 19.

(6) Moreover, the present invention is also applicable to a fixing apparatus that has a pair of rotational members 18 and 19 for forming the fixation nip N, one of which is an endless belt, and the other of which is a roller, or both of which are endless belts or rollers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a reading portion configured to read (a) a shape of a sheet to be used for image formation, and (b) an original sheet carrying an original image;
an image forming portion configured to form a toner image, corresponding to the original image read by said reading portion, on the sheet to be used for image formation;
a fixing portion configured to fix the toner image, formed by said image forming portion, to the sheet to be used for image formation; and
a controller configured to control a fixing condition of said fixing portion in accordance with the shape of the sheet to be used for image formation read by said reading portion.

2. The image forming apparatus according to claim 1, wherein the fixing condition is controlled on the basis of information determined on the basis of the shape of the sheet to be used for image formation read by said reading portion correspondingly to a width size of the sheet to be used for image formation.

3. The image forming apparatus according to claim 1, wherein said reading portion reads the shape of the sheet to be used for image formation in response to input of information corresponding to a first instruction for reading the sheet to be used for image formation having a non-rectangular shape, and said reading portion reads the original sheet carrying the original image in response to input of information corresponding to a second instruction for reading the original image.

4. The image forming apparatus according to claim 1, further comprising an acquiring portion configured to acquire information corresponding to a kind of the sheet to be used for image formation, wherein said controller controls the fixing condition on the basis both of the shape and the kind of the sheet to be used for image formation.

5. The image forming apparatus according to claim 4, wherein the kind of the sheet to be used for image formation represents a basis weight of the sheet to be used for image formation.

6. The image forming apparatus according to claim 1, wherein said fixing portion includes a first rotatable member and a second rotatable member, said first rotatable member and said second rotatable member being configured to form a nip in which the image, formed on the sheet to be used for image formation by said image forming portion, is heated by a heater, and
wherein said controller controls a temperature of said first rotatable member in accordance with the shape of the sheet to be used for image formation read by said reading portion.

7. An image forming apparatus comprising:
a reading portion configured to read a shape of a sheet to be used for image formation;
a receiving portion configured to receive information corresponding to an original image from an external terminal outside of said image forming apparatus;
an image forming portion configured to form a toner image, corresponding to the information received by said receiving portion, on the sheet to be used for image formation;
a fixing portion configured to fix the toner image, formed by said image forming portion, on the sheet to be used for image formation, and
a controller configured to control a fixing condition of said fixing portion in response to a shape of the sheet to be used for image formation read by said reading portion.

8. The image forming apparatus according to claim 7, wherein said controller controls the fixing condition on the basis of information that is determined on the basis of the shape of the sheet to be used for image formation read by said reading portion and based on a difference between a width of the sheet to be used for image formation and a width of a portion of said fixing portion.

9. The image forming apparatus according to claim 7, wherein said fixing portion includes a first rotatable member and a second rotatable member, said first rotatable member and said second rotatable member being configured to form a nip for in which the image, formed on the sheet to be used for image formation by said image forming portion, is heated by a heater, and wherein said controller controls a temperature of said first rotatable member in accordance with the shape of the sheet to be used for image formation read by said reading portion.

* * * * *